United States Patent
Jindal et al.

(10) Patent No.: US 10,911,517 B2
(45) Date of Patent: Feb. 2, 2021

(54) DETERMINING END TIMES FOR SINGLE PAGE APPLICATIONS

(71) Applicant: Cisco Technology, Inc., San Jose, CA (US)

(72) Inventors: Shubham Jindal, Bangalore (IN); Lehong Hu, Belmont, CA (US); Xiaolu Li, San Francisco, CA (US); Binil David Thomas, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/278,136

(22) Filed: Feb. 17, 2019

(65) Prior Publication Data

US 2020/0267203 A1 Aug. 20, 2020

(51) Int. Cl.
*H04L 29/08* (2006.01)
*H04L 12/24* (2006.01)
*H04L 12/26* (2006.01)
*H04L 12/911* (2013.01)

(52) U.S. Cl.
CPC .......... *H04L 67/025* (2013.01); *H04L 41/064* (2013.01); *H04L 43/067* (2013.01); *H04L 43/0811* (2013.01); *H04L 47/822* (2013.01); *H04L 67/34* (2013.01)

(58) Field of Classification Search
CPC ..... H04L 67/025; H04L 67/34; H04L 43/064; H04L 43/067; H04L 43/0811; H04L 43/822; H04L 41/064
See application file for complete search history.

(56) References Cited

U.S. PATENT DOCUMENTS

| | | | |
|---|---|---|---|
| 7,912,927 B2 | 3/2011 | Thangadurai | |
| 2009/0259934 A1* | 10/2009 | Prisament | G06F 16/972 715/234 |
| 2010/0088404 A1* | 4/2010 | Mani | H04L 67/02 709/224 |
| 2013/0125143 A1* | 5/2013 | Kikuchi | G06F 9/542 719/318 |

(Continued)

OTHER PUBLICATIONS

Mickens, et al., "Mugshot: Deterministic Capture and Replay for JavaScript Applications", Proceedings of NSDI, Apr. 2010, Microsoft Research, printed on Sep. 11, 2019, 15 pages.

(Continued)

*Primary Examiner* — Blake J Rubin
(74) *Attorney, Agent, or Firm* — Behmke Innovation Group LLC; James M. Behmke; James J. Wong

(57) ABSTRACT

In one embodiment, a monitoring process detects a page load start time of a single page application (SPA) page having added direct resources and dynamic resources, tracks the direct resources and dynamic resources, and notes a load end time for each of the tracked direct resources and dynamic resources. The monitoring process stops the tracking of the direct resources and dynamic resources in response to a determination of a threshold duration of network inactivity, and determines a maximum load end time of the tracked direct resources and dynamic resources. Accordingly, the monitoring process may then set a page load time of the SPA page as a difference between the maximum load end time and the page load start time.

14 Claims, 21 Drawing Sheets

(56) References Cited

U.S. PATENT DOCUMENTS

| | | | | |
|---|---|---|---|---|
| 2013/0185643 | A1* | 7/2013 | Greifeneder | H04L 67/22 715/736 |
| 2015/0019991 | A1* | 1/2015 | Kristj Nsson | H04L 41/0853 715/747 |
| 2015/0188779 | A1* | 7/2015 | McCanne | H04L 63/10 709/203 |
| 2015/0222512 | A1* | 8/2015 | Kay | G06F 11/3003 709/224 |
| 2015/0281321 | A1* | 10/2015 | Hrytsevich | H04L 67/26 709/203 |
| 2016/0323367 | A1* | 11/2016 | Murtha | G06F 9/505 |
| 2016/0378879 | A1* | 12/2016 | De Coninck Owe | G06F 16/9574 718/102 |
| 2017/0034030 | A1 | 2/2017 | Feng et al. | |
| 2017/0041296 | A1* | 2/2017 | Ford | H04W 12/06 |
| 2017/0070389 | A1* | 3/2017 | Rhoades | H04L 41/082 |
| 2017/0237799 | A1* | 8/2017 | Veeravalli | H04L 67/025 709/224 |
| 2017/0346758 | A1* | 11/2017 | Dimitropoulos | H04L 47/765 |
| 2018/0013840 | A1* | 1/2018 | Mitevski | H04L 67/146 |
| 2018/0113646 | A1* | 4/2018 | Spivak | G06F 3/0653 |
| 2018/0316778 | A1* | 11/2018 | Tucker | H04L 67/02 |
| 2019/0171542 | A1* | 6/2019 | Lackner | G06F 11/3414 |
| 2019/0253332 | A1* | 8/2019 | Briere | G06F 16/951 |
| 2019/0278438 | A1* | 9/2019 | Boyd | G06F 9/451 |
| 2019/0297147 | A1* | 9/2019 | Drasin | H04L 63/0807 |

OTHER PUBLICATIONS

Nguyen, James, "Redefining 'Page Load' in the Age of Single-Page Apps", New Relic, Dec. 15, 2016, printed Sep. 11, 2019, 7 pages.
Jansma, Nic, "How-To: Provide Real User Monitoring for Single-Page Applications", Akamai Developer, May 20, 2015, printed Sep. 11, 2019, 10 pages.
Veeravalli, Sreedhar, "Measuring and Optimizing Performance of Single-Page Applications (SPA) Using RUM", Linkedin Engineering, Feb. 2, 2017, printed Sep. 11, 2019, 7 pages.
International Search Report dated Jun. 8, 2020 in connection with International Application No. PCT/US2020/016953.

* cited by examiner

DETERMINING END TIMES FOR SINGLE PAGE APPLICATIONS

TECHNICAL FIELD

The present disclosure relates generally to computer networks, and, more particularly, to determining end times for single page applications (SPAs).

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In one particular example, a Single Page Application (SPA) is a web browser application that interacts with a user by dynamically rewriting a current web page rather than loading entire new pages from a server. In an SPA's first load, all necessary code to construct the web application is retrieved in an initial single page load, then additional code, data, and resources can be loaded by "XMLHttpRequest" requests (XHRs) (XML—Extensible Markup Language; HTTP—Hypertext Transfer Protocol). After that, page transitions will simply be content changes through XHR requests or memory state changes. Because these are not full page loads, they are generally referred to as "virtual pages" or "virtual pageviews".

Since Single Page Apps (SPAs) have changed the loading behavior of web pages, however, traditional performance metric monitoring techniques are inadequate. That is, conventional agents that are designed to monitor web application performance data in browsers have not kept up with the newer loading behaviors of SPAs, and thus continue to report inaccurate metrics.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
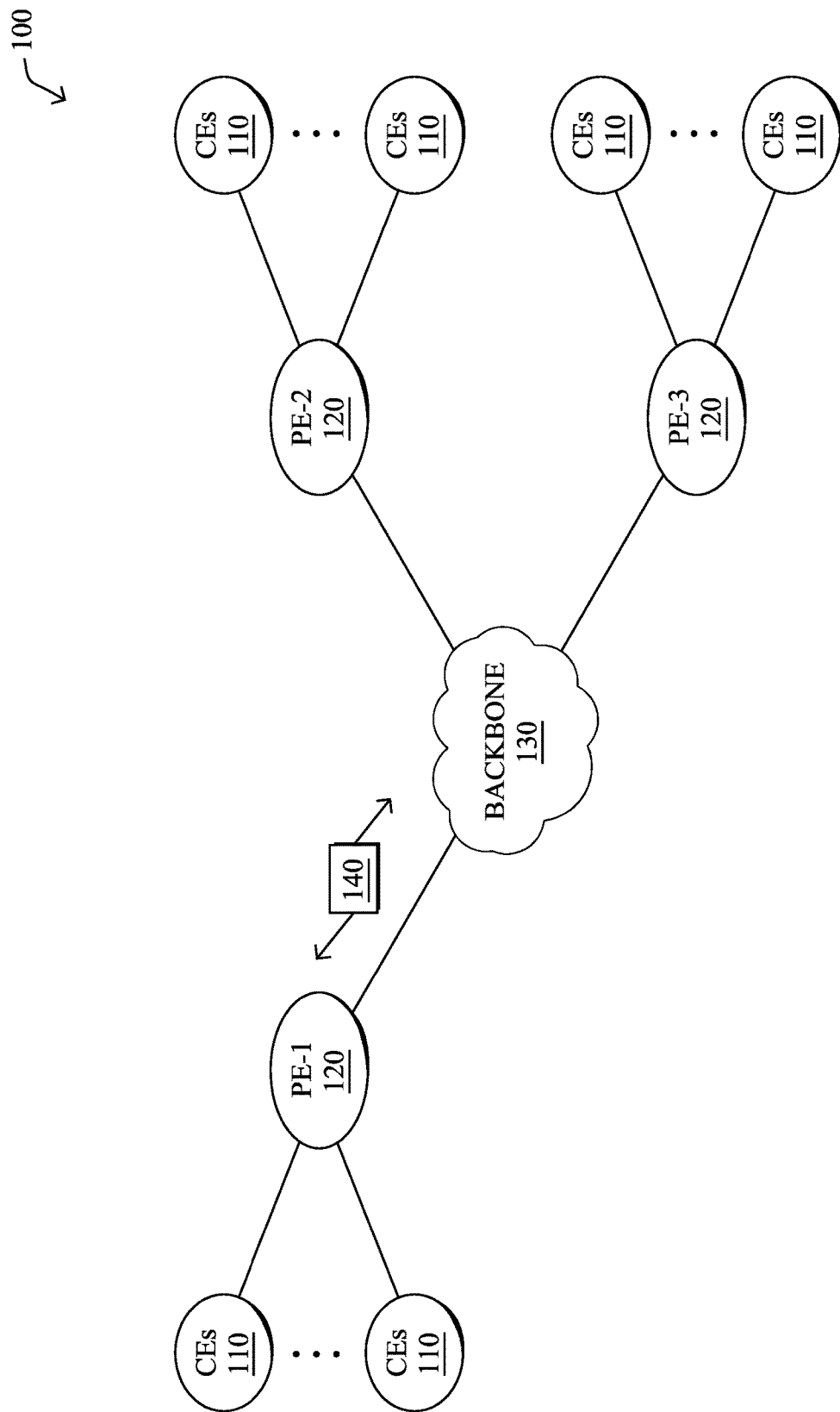
FIGS. 1A-1B illustrate an example computer network.

According to one or more embodiments of the disclosure, a monitoring process detects a page load start time of a single page application (SPA) page having added direct resources and dynamic resources, tracks the direct resources and dynamic resources, and notes a load end time for each of the tracked direct resources and dynamic resources. The monitoring process stops the tracking of the direct resources and dynamic resources in response to a determination of a threshold duration of network inactivity, and determines a maximum load end time of the tracked direct resources and dynamic resources. Accordingly, the monitoring process may then set a page load time of the SPA page as a difference between the maximum load end time and the page load start time.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
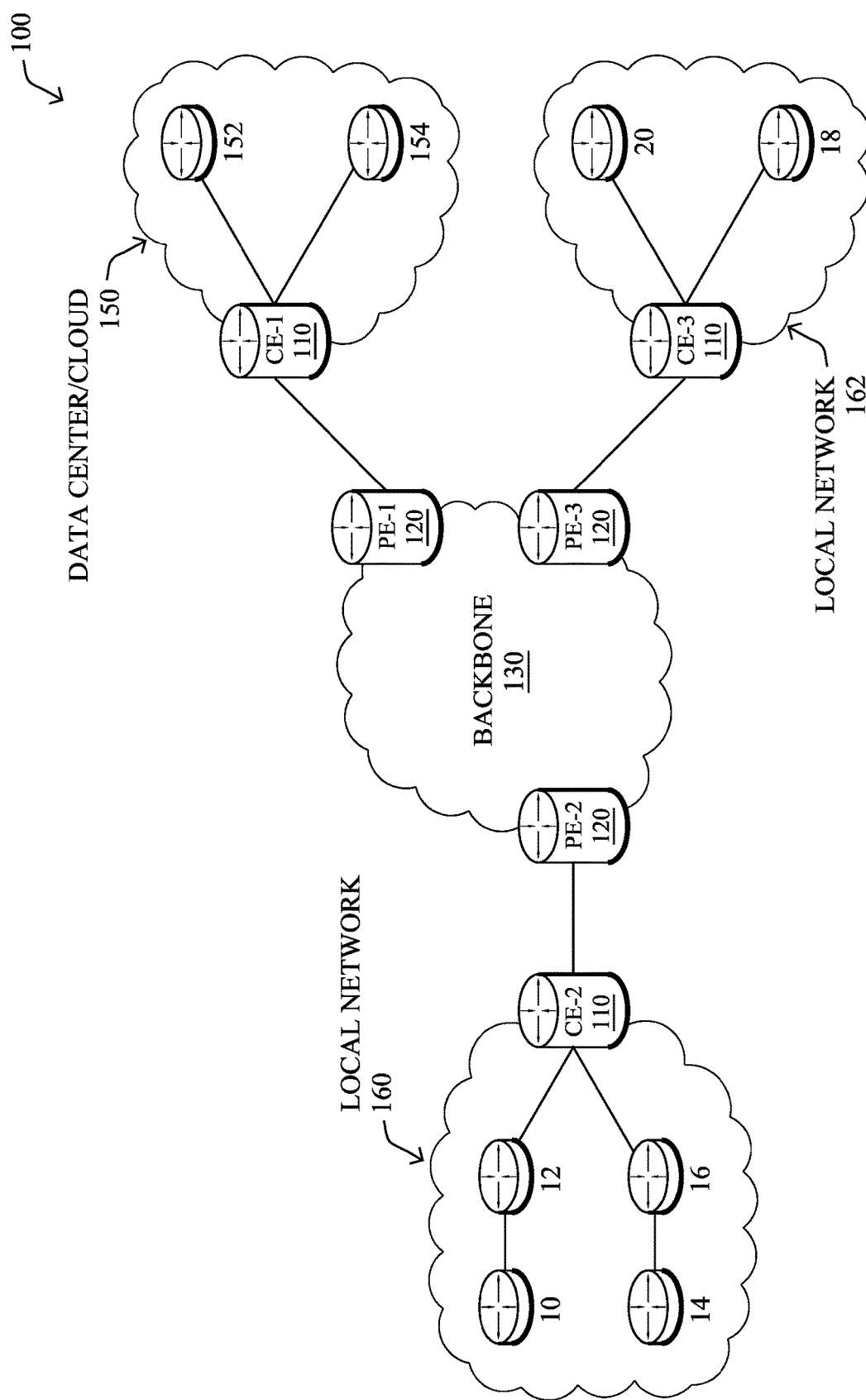

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
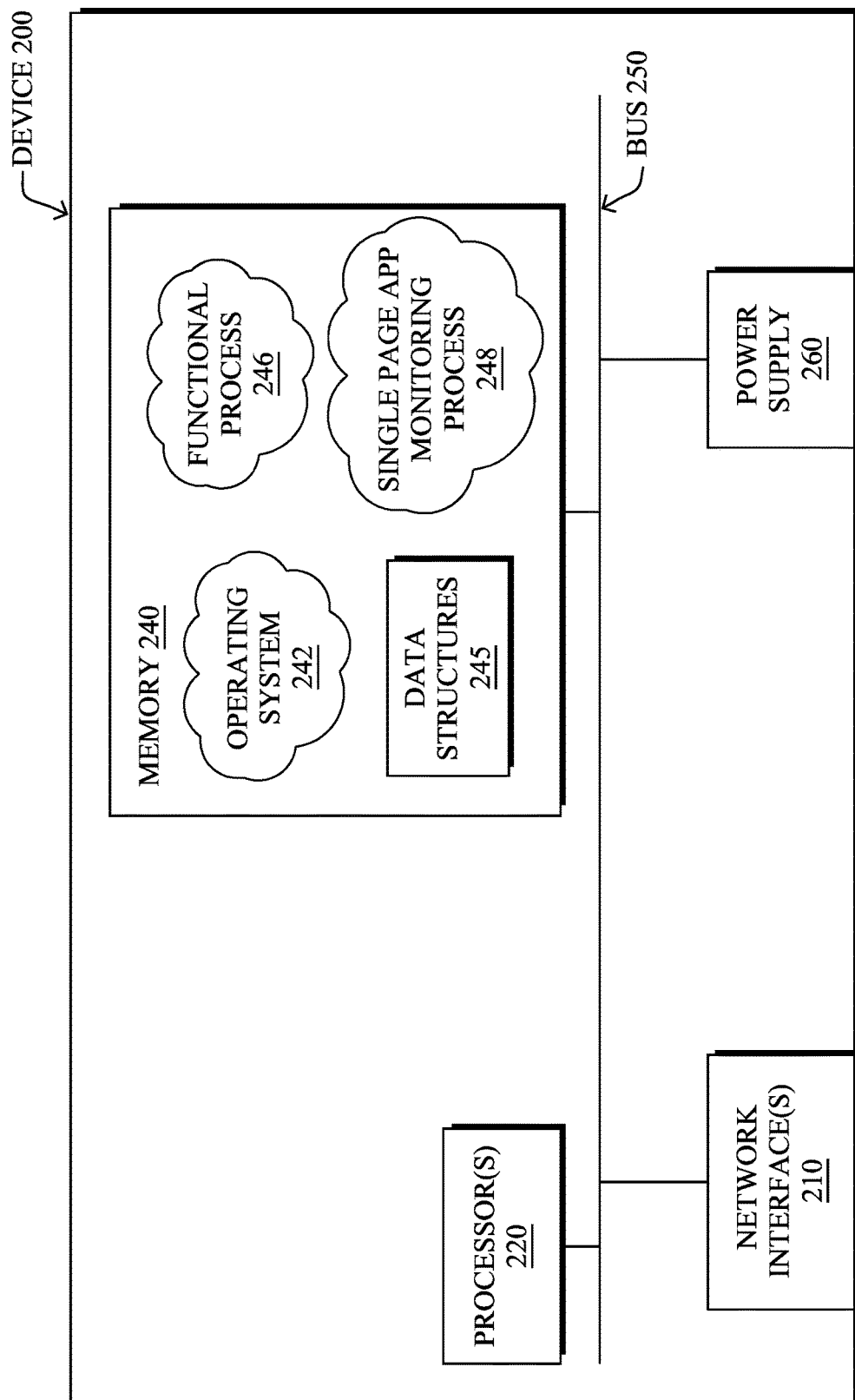
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "Single Page App Monitoring" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
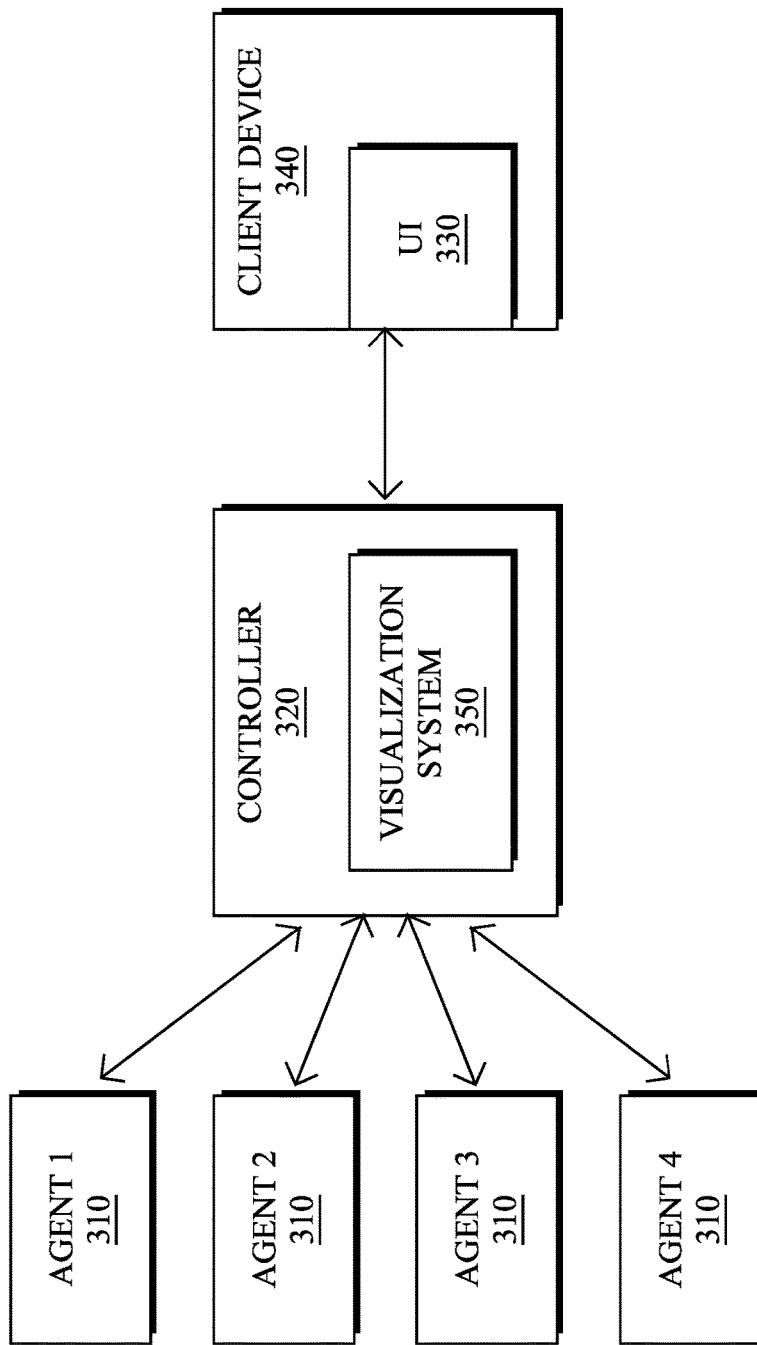
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
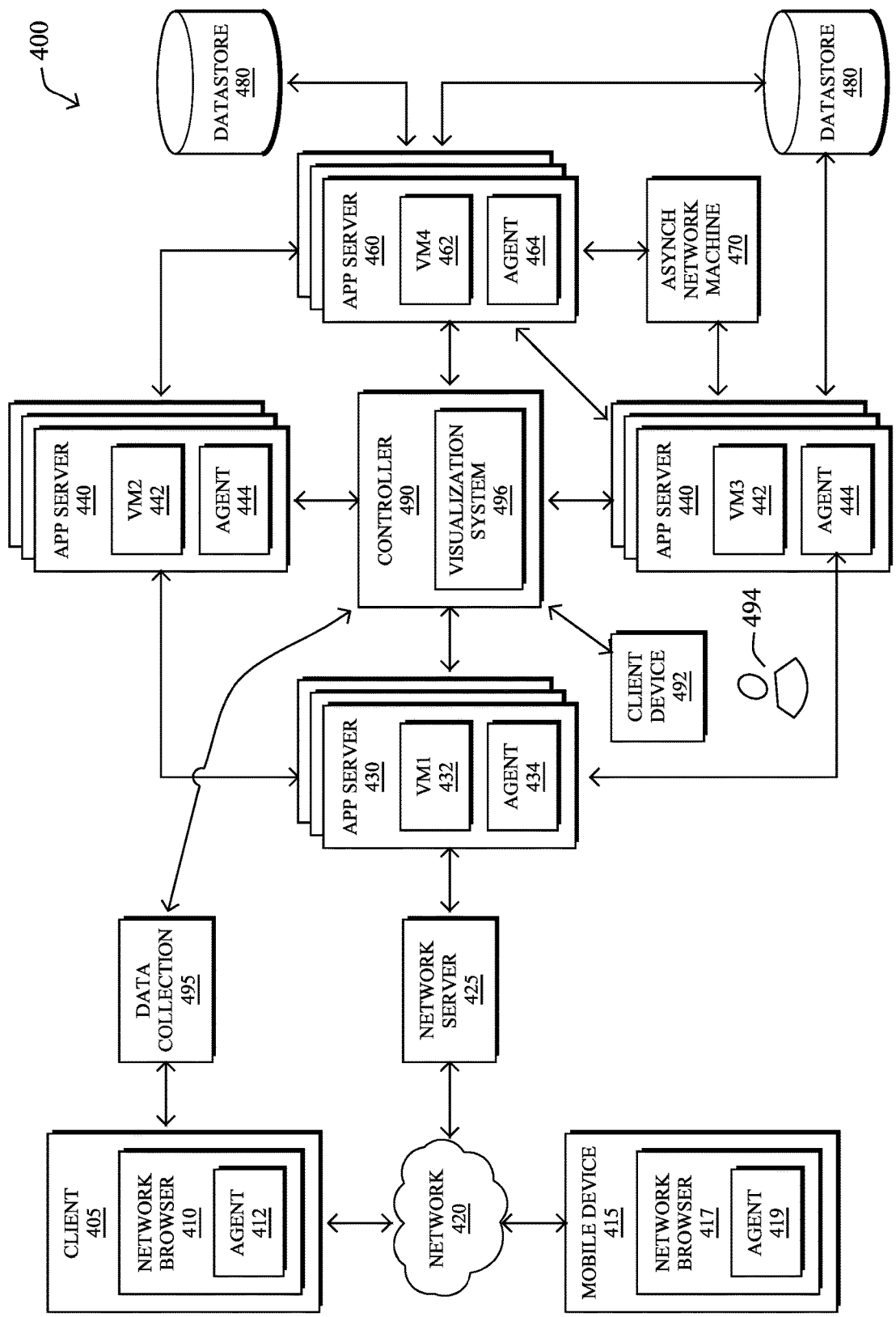
FIG. 4 illustrates an example system for an application-aware intrusion detection system.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
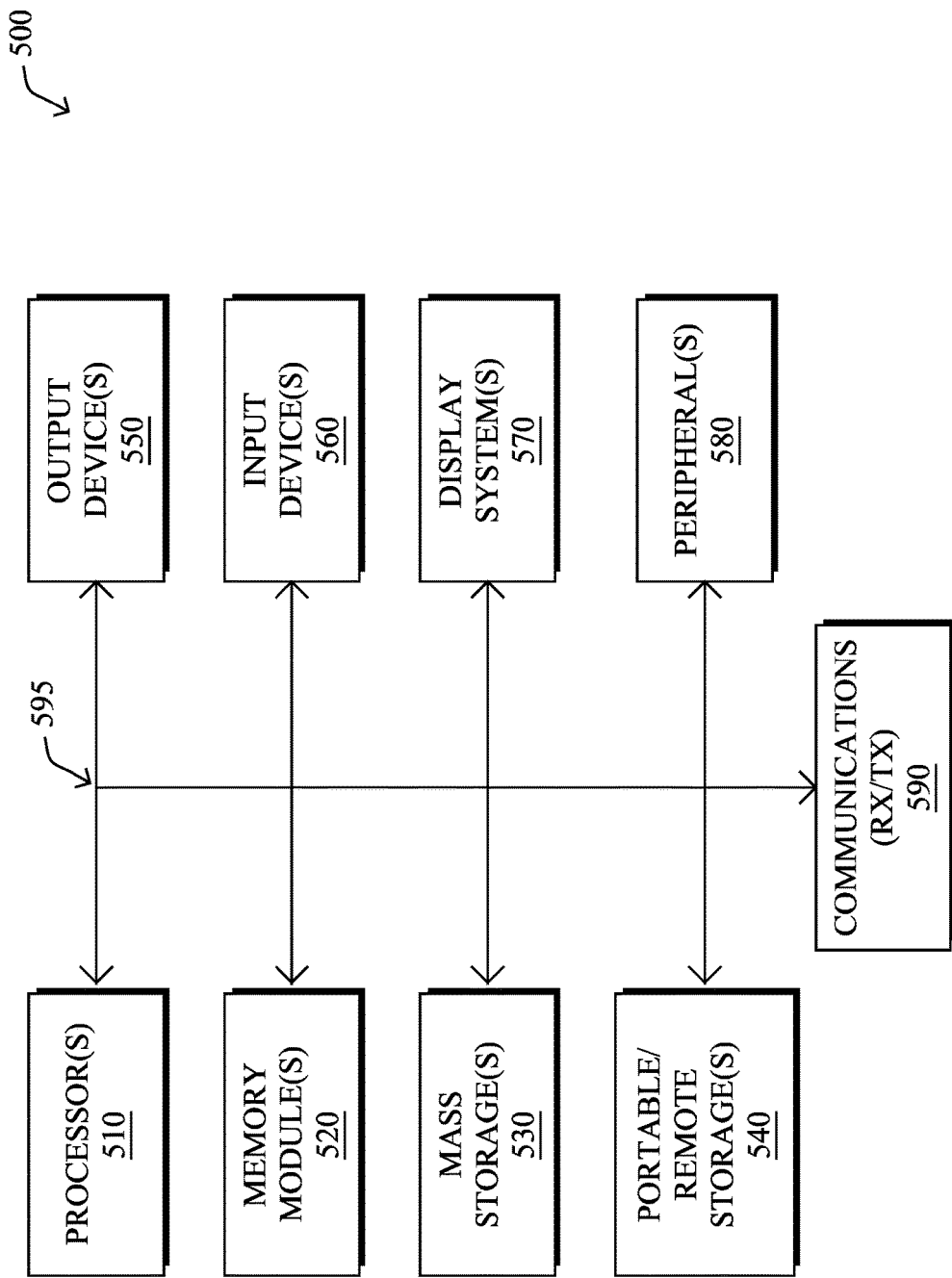
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG.

2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Determining Start Times and Cause-Based Event Correlation for Virtual Page Transitions in SPAs—

As mentioned above, Single Page Applications (SPAs) typically load an initial page first, and then when a certain event occurs (e.g., a user does something) to navigate to another page, the web browser application does not reload the entire page, but only some codes, data, resources, etc., to load a virtual page (or virtual pageview).

Notably, there are often some resources that are downloaded for a new virtual page that actually began or completed before a URL change. Unlike traditional pages, however, the start of a virtual page is not the URL change but the time at which some cause occurred to initiate the virtual page (e.g., user interaction events or otherwise). For example, when a user clicks something (e.g., a link, an icon, a button, etc.) on a page and resources begin to load for a new virtual page, the time at which the user clicked should be the start time for that new virtual page. In traditional monitoring, however, since any resource loading, such as XMLHttpRequests (XHRs), happen before the URL changes, those resources will be linked to the old virtual page, which is incorrect, and the start time of the virtual page is set to the time of the URL change, which is inaccurate.

Certain techniques herein, therefore, provide for a "causality chaining" method that will link any loaded resources (e.g., XHR) to their root cause (e.g., user interactions or otherwise), where if a URL then changes (a new virtual page), those resources are correctly related to the newly loaded virtual page, and a more accurate start time can be marked as the root cause (e.g., the user's click), rather than the URL change itself. In particular, since XHRs play a large role in page transitions in SPAs, correlating the XHRs to transitions (virtual pages) provides an important picture to the site owner about the overall performance of the virtual pages. Accordingly, it would not be accurate if the correlation is simply based on the time that the virtual page starts loading, as noted above.

Figure 6:
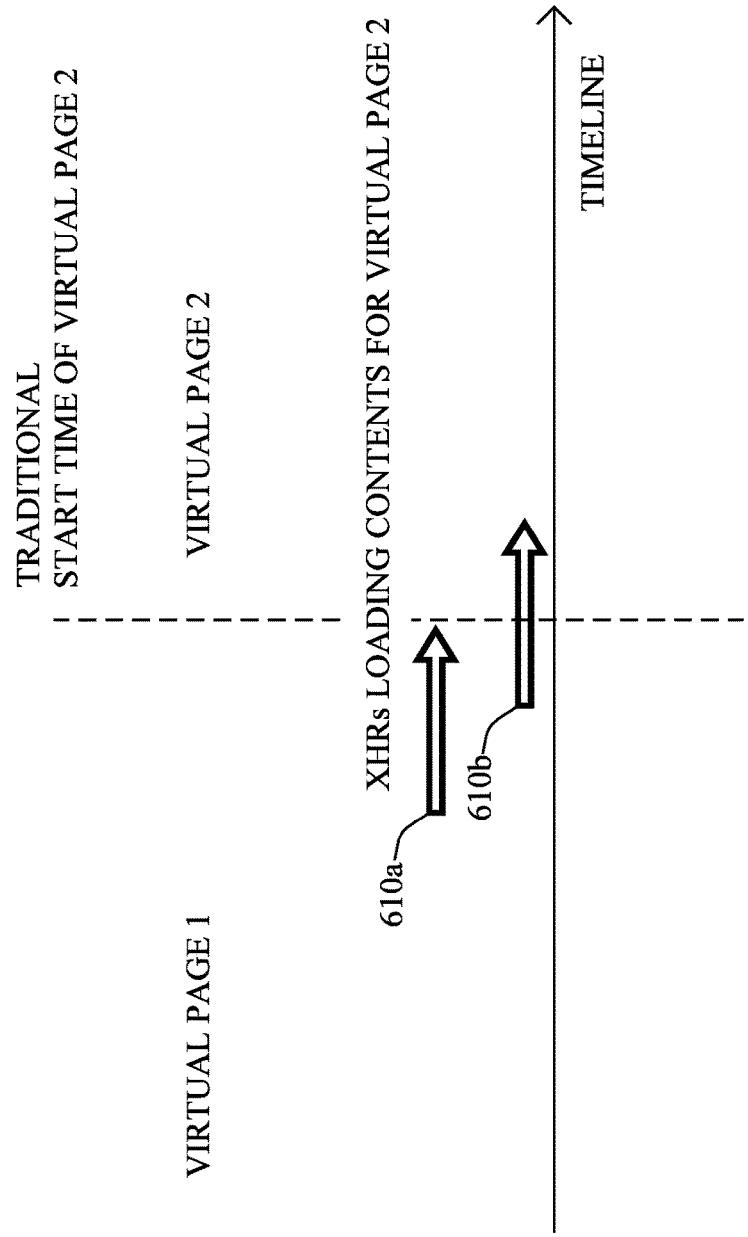
FIG. 6 illustrates an example of dynamic resources loading prior to virtual page transitions.

Consider, for example, a common case illustrated with reference to the timeline 600 of FIG. 6, where during virtual page 1, two XHRs 610a and 610b begin loading the content of the next virtual page 2. The system marks a browser history change (e.g., URL change) in its callback function after receiving all response data from the first XHR 610a. Here, correlating XHRs based on their occurrence after the next virtual page 2 loads mistakenly correlates XHR 610a, which is actually contributing to the next virtual page 2, to the previous virtual page 1. Additionally, XHR 610b occurring on both sides of the page transition can further result in inaccurate or incorrect measurements.

Accordingly, correlating XHRs simply by when they occur in time and which virtual page is operational at that time will inaccurately misrepresent a large population of XHRs, which occur right before the next virtual page transition and directly provide content for that virtual page. The techniques herein, therefore, address this problem as well, and correctly correlate the XHRs to provide an accurate picture of which XHRs relate to which virtual page. For instance, as described below, XHRs that are both causing an SPA transition and contributing after the SPA transition can be correctly correlated to the virtual page to which they belong.

Specifically, according to one or more embodiments of the disclosure as described in detail below, a monitoring process detects one or more events capable of causing a future state change in a browser application having initially loaded a single page application (SPA) page, and maintains one or more causality chains of the one or more events, each causality chain tracing events of that causality chain to a respective root cause event of that causality chain. Upon detecting a virtual page transition to create a new virtual page, the monitoring process may determine that a cause of the virtual page transition matches a particular root cause event of a particular causality chain, and correlates all events of the particular causality chain to the new virtual page (e.g., where events may notably include Extensible Markup Language Hypertext Transfer Protocol Requests (XHRs)). According to one or more additional embodiments of the disclosure, the monitoring process may further set a start time of the particular root cause event as the start time of the new virtual page.

Operationally, a newly defined "causality chain" technique can be used to determine the cause and start time of transitions. As detailed further below, a causality chain is a stack-like data structure, used to store a chain of detected events. In particular, when an event happens that is capable of causing a future state change in a web browser (a "transition"), the system herein stores (pushes) the events and their start times in the causality chain (e.g., storing a beginning state/URL and ending state/URL of the transition, and the cause or "trigger" of the event, including any parental relation to a previous event that caused the stored event). If the event does not trigger a transition or when the transition completes, the event will be popped out from (removed from) the causality chain.

Generally, there are four types of events may cause the state of web applications transition:
i) user interactions (e.g., explicit user activity such as key presses, mouse or finger clicks, scrolls, etc.);
ii) timer functions such as intervals or other scheduled event firings (e.g., setTimeout, setInterval, etc.);
iii) window messages (e.g., postMessage, receiveMessage, etc.); and
iv) XMLHttpRequests (XHRs) or other callbacks (e.g., xhr.onload, xhr.onreadystatechange, xhr.send, xhr.open, etc.).

Others may also be or become available, and the list above is not meant to be limiting to the scope of the embodiments herein.

Figure 7:
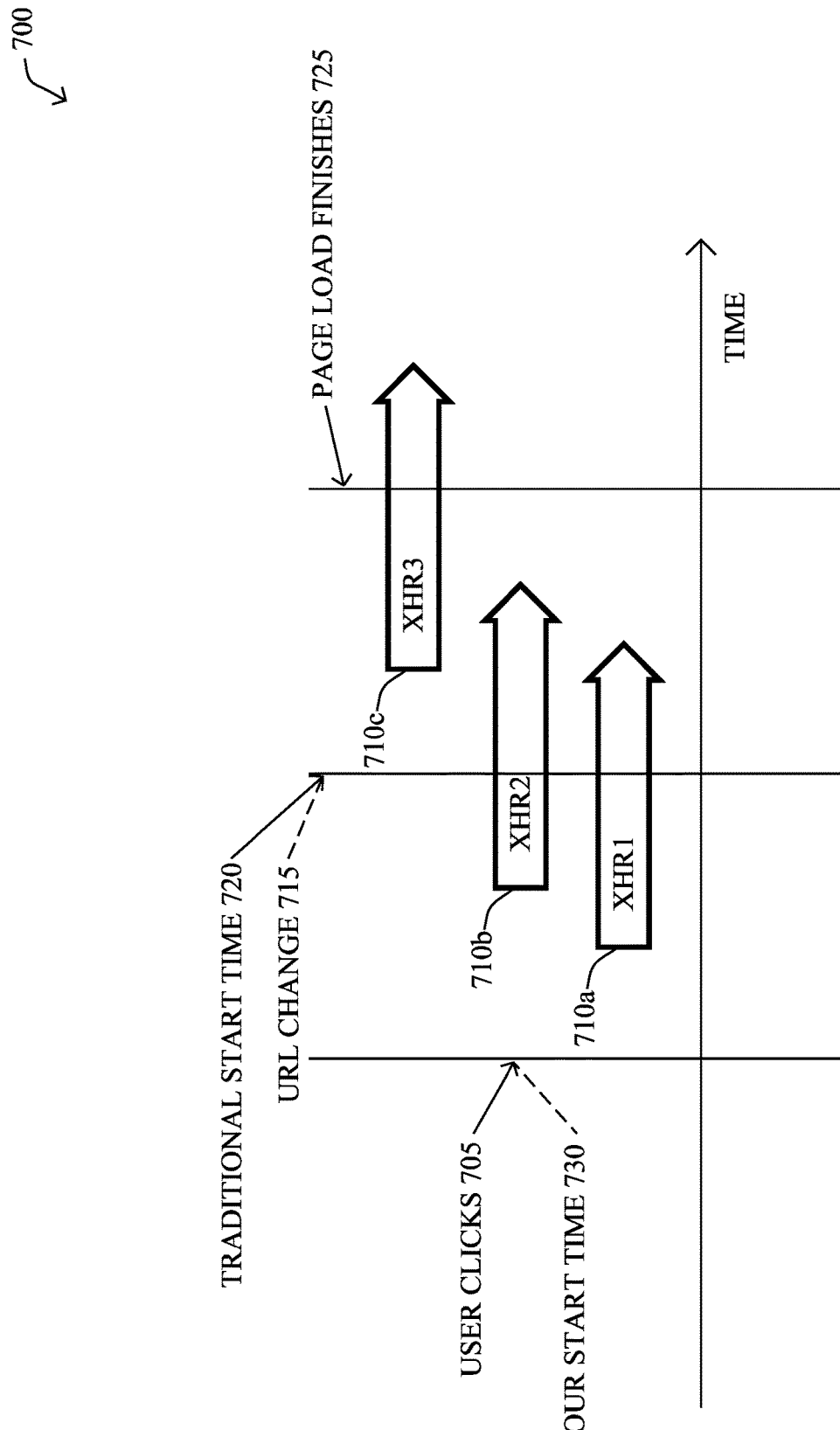
FIG. 7 illustrates an example of start times of virtual page transitions.

Recall from above that improper timing associations for page start times can occur on either side of a transition when inadequate time markers are used. For example, and with reference to the timeline 700 of FIG. 7, when a user clicks a button (705), various functions may send requests 710 (e.g., XHR1 710a and XHR2 710b) and when the requested data is loaded, the URL changes (715). Further requests 710c may also be triggered to be loaded after the URL change, and may complete before or after the page is deemed to have been loaded (725) (depending upon when the end time is calculated, such as described in greater detail below). Unlike traditional monitoring, which would declare the start time 720 to be the URL change 715, the techniques herein set the new virtual page start time 730 to be the click time 705. Note also, therefore, that while in traditional monitoring, XHR1 and XHR2 (e.g., requests to download html/css files for the next page before the URL change) would be related to an older virtual page, the techniques herein correctly link XHR1 and XHR2 to the new virtual page.

According to one or more of the embodiments herein, a technique is defined that determines the real cause of the XHRs and also the real cause of the virtual page transitions, then correlates the XHRs to the virtual page when their causes match. This allows for determining a more accurate start time for a virtual page transition, accordingly.

In particular, in order to determine these causes, recall that after the initial page load, the state of a browser application can only be by certain actions (e.g., user action, time-based events, window messages, XHR callbacks, etc.). Therefore, the techniques herein specifically monitor for every such event or function call to record a possible cause of a future change. From these events, the techniques herein can thus create a causal event that can be stored and tracked (e.g., pushed into and popped out of a stack around the event handler of the event). In this manner, the techniques herein essentially "wrap" the event handler with the causal event.

Figure 8:
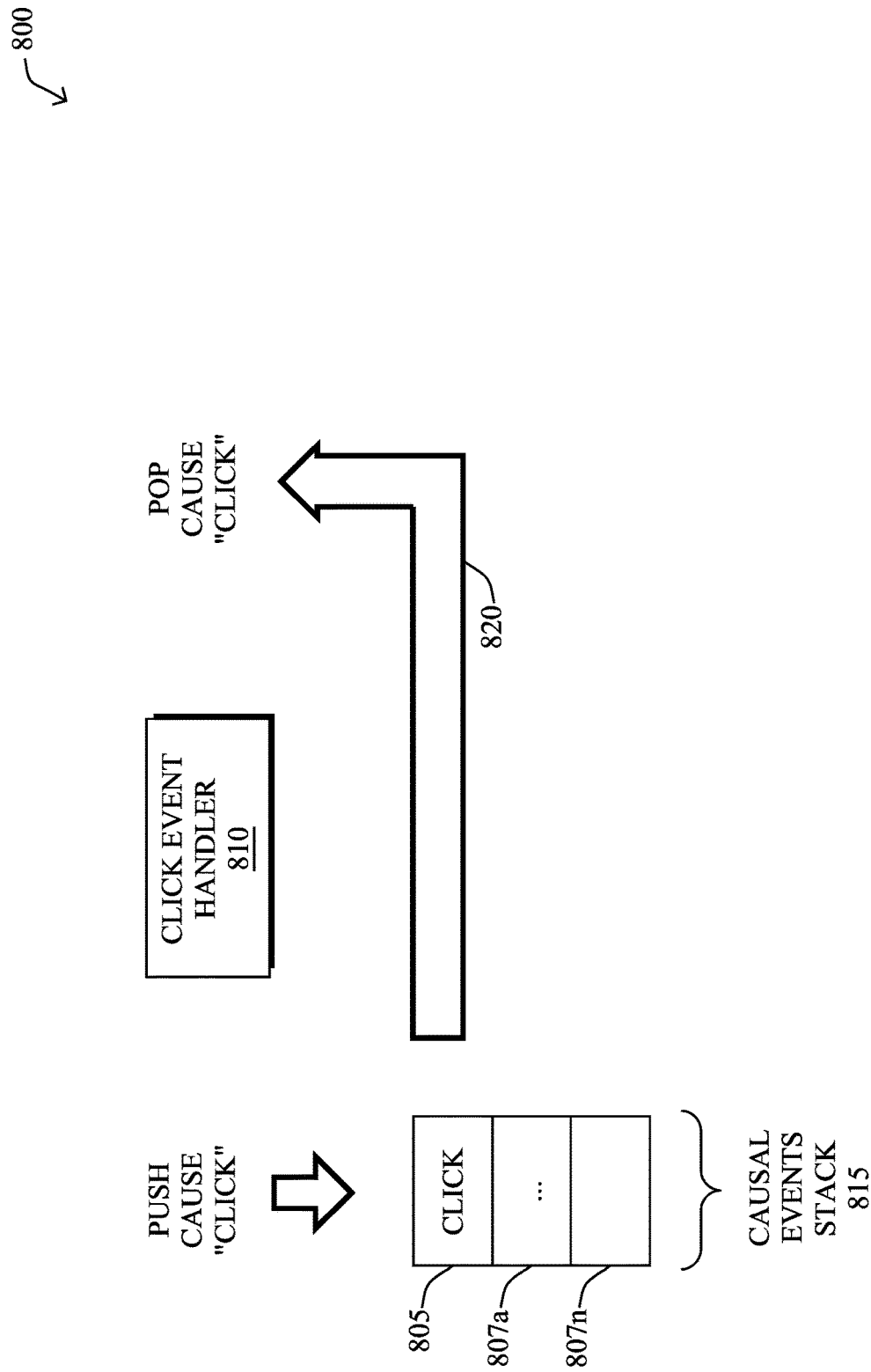
FIG. 8 illustrates an example of wrapping events with a causal events stack.

With reference to the wrapping function 800 shown in FIG. 8, using a "click" event 805 as an example, if there is an event handler 810 or callback function from the click event, the techniques herein wrap the event handler 810 with a snippet to push the "click" 805 into the Causal Event Stack 815 before the event handler 810 (e.g., on top of other events 807a-n). In this manner, during the event handler execution, the techniques herein can determine that the cause of the handler was the "click" 805 by fetching the top of the Causal Event Stack 815. Upon completion of the event handler execution, the "click" is popped from the Causal Event Stack 815 (shown as action 820).

Figure 9:
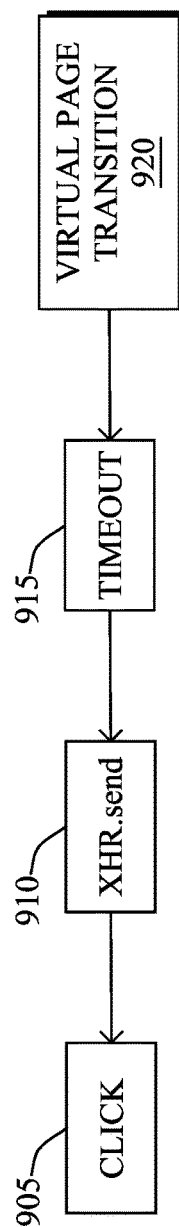
FIG. 9 illustrates an example of causality chaining.

Notably, and with reference to FIG. 9, there are instances where one event causes another event to happen, in what is referred to herein as a "causality chain" 900. For example, a user's "click" 905 to a button may illustratively cause an XMLHttpRequest (XHR) 910 to be sent (e.g., "XHRSend"), where the XHR 910 then causes a timer expiration 915, which in the end causes a history change and therefore a virtual page 920. These causal events can be chained by their parent property, i.e., the techniques herein retrieve the parent of an event, allowing back-tracing the causality chain 900 from the new virtual page 920, by following the parents of each causal event, to determine the root cause of the page 920 (e.g., the initial "click" 905).

According to embodiments of the present disclosure, techniques herein are also defined that can correlate cause-based events, illustratively XHRs, to virtual page transitions. For instance, a monitoring service (e.g., an "XHRMonitor") may be established to continuously monitor XHR activity. In addition, another monitoring service (or optionally a component of the same monitoring service above) may further continuously monitor virtual pages (e.g., a "VirtualPageMonitor") for transitions. Notably, both monitors may optionally be a component of a shared Single Page App Monitoring process 248, or else may be configured as their own separate functions (e.g., individual processes 248).

Figure 10A:
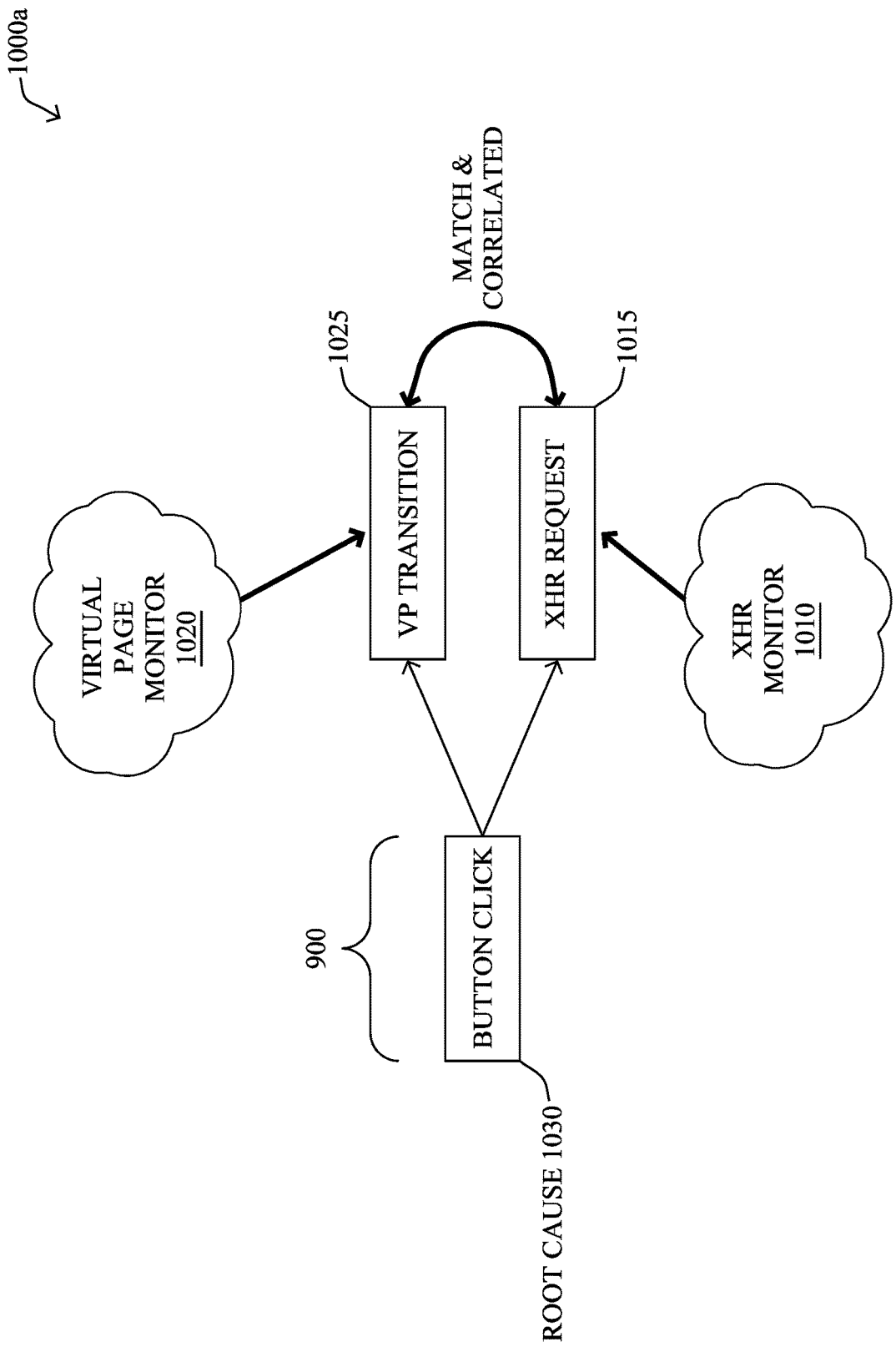
FIGS. 10A-10D illustrate examples of root cause correlation between events and virtual pages.
Figure 10B:
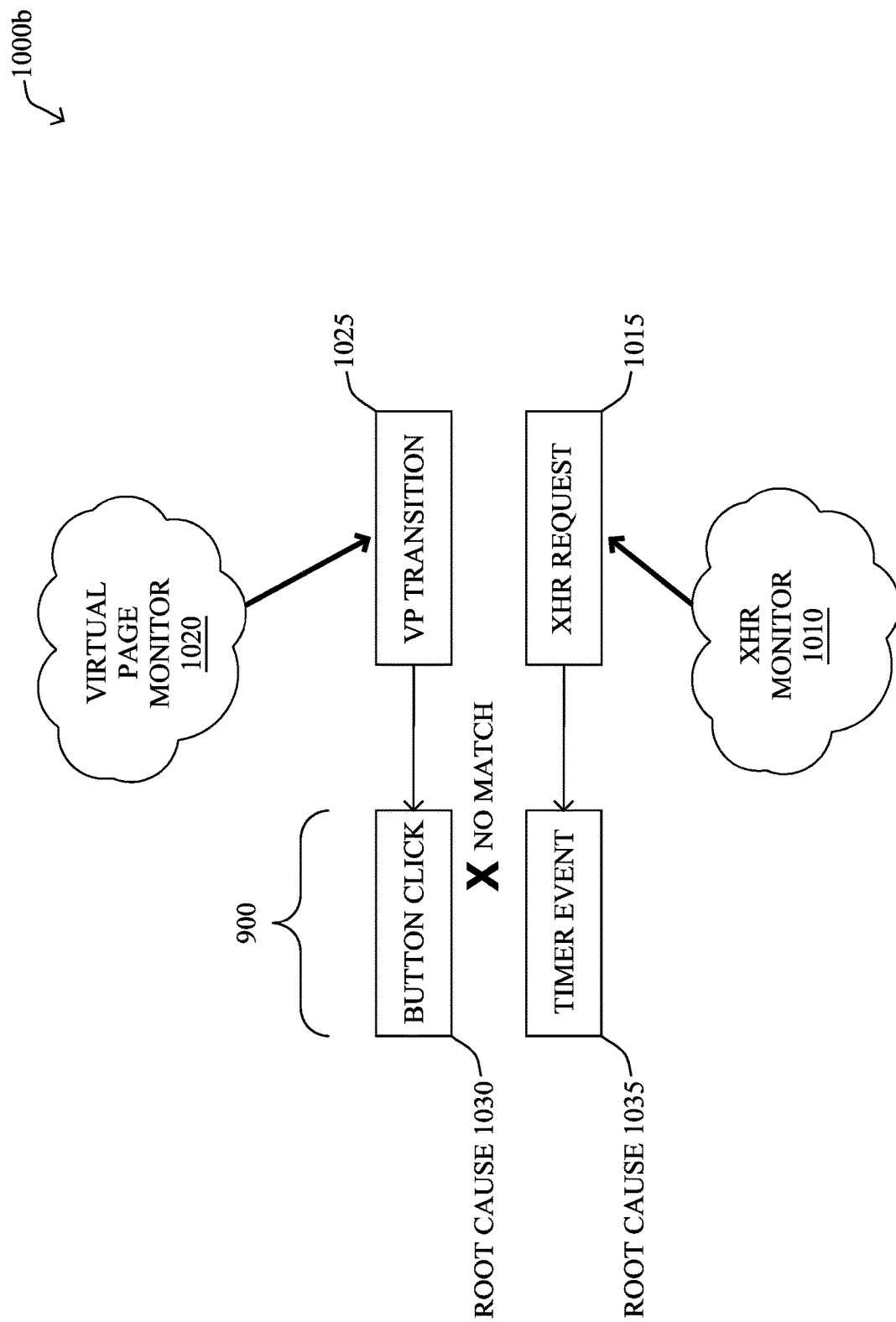

Referring to FIG. 10A, for example 1000a, when XHR-Monitor 1010 creates an XHR event 1015 (e.g., XHR request), the techniques herein may then check the VirtualPageMonitor 1020 for the current virtual page event 1025 (e.g., VP Transition). As mentioned above, the causality chain 900 may then be traced from each event 1015/1025 to determine the root causes of each event. If, as shown in FIG. 10A, the root causes match (e.g., button click 1030), then this XHR event 1015 is correlated to the virtual page 1025 (e.g., and the XHR event is reported as such). However, if, as shown in example 1000b of FIG. 10B, the root causes do not match (e.g., button click 1030 corresponds to the YP transition 1025, but a timer 1035 initiated the XHR request 1015), then the technique continues as described below.

Figure 10C:
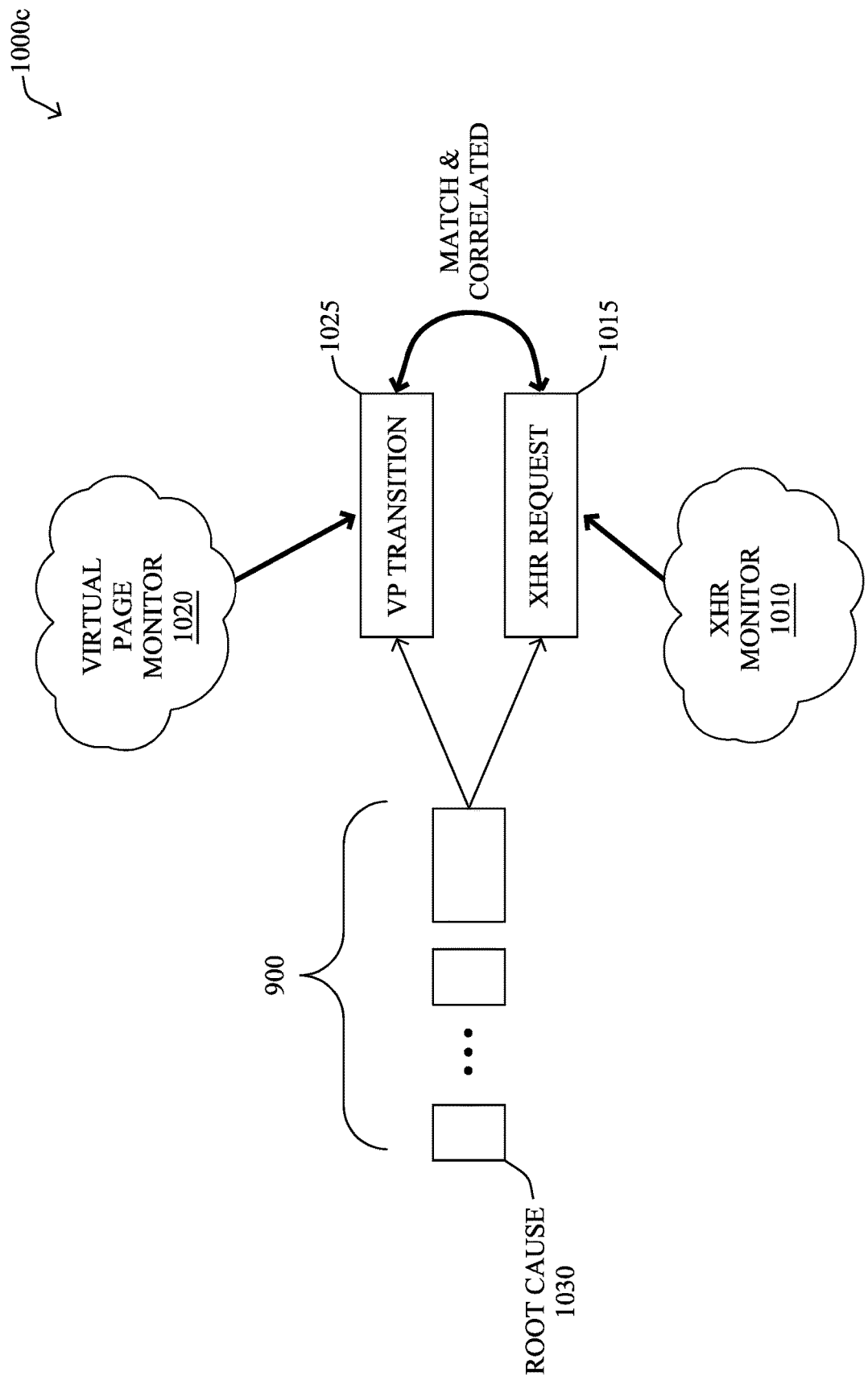
Figure 10D:
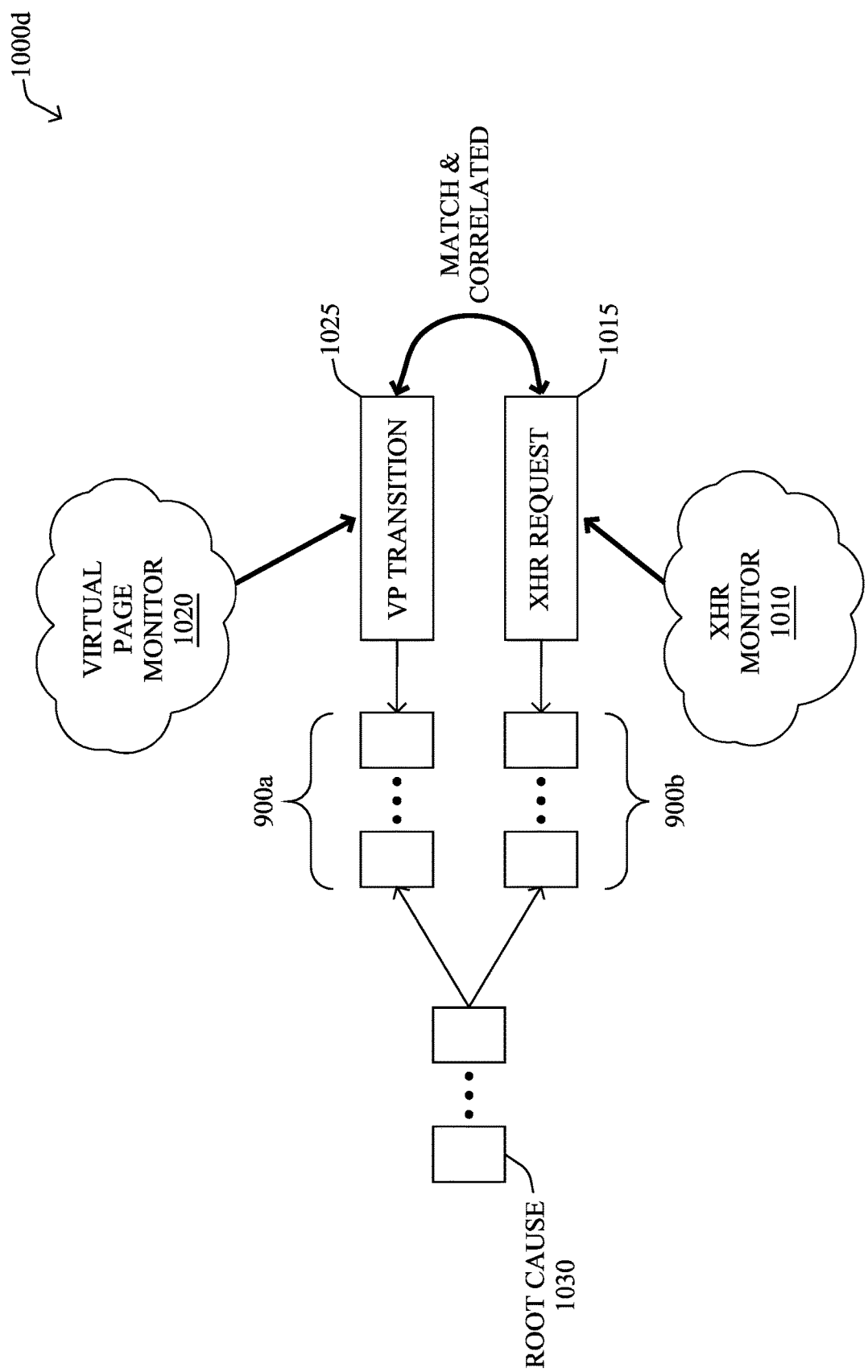

Note that as illustrated in example 1000c of FIG. 10C, the causality chain 900 may include multiple chained events (as described above) leading back to the same root cause. Moreover, as shown in example 1000d of FIG. 10D, multiple causality chains 900a/b can eventually merge to the same root cause, as well. Any logical trace can occur, and those shown herein are merely examples for illustration.

If the root causes do not match, as noted above, the event (e.g., XHR event 1015) may be placed into a parent virtual page "waiting queue" indexed by a unique ID of the cause event. When a next virtual page 1025 is created, the VirtualPageMonitor 1020 will look to the XHRMonitor 1010's parent virtual page waiting queue, and uses the cause of the virtual page to search for the XHR events. If such matching XHR events are found, the techniques herein remove them out the waiting queue, correlate them to the new virtual page, and report them.

Figure 11:
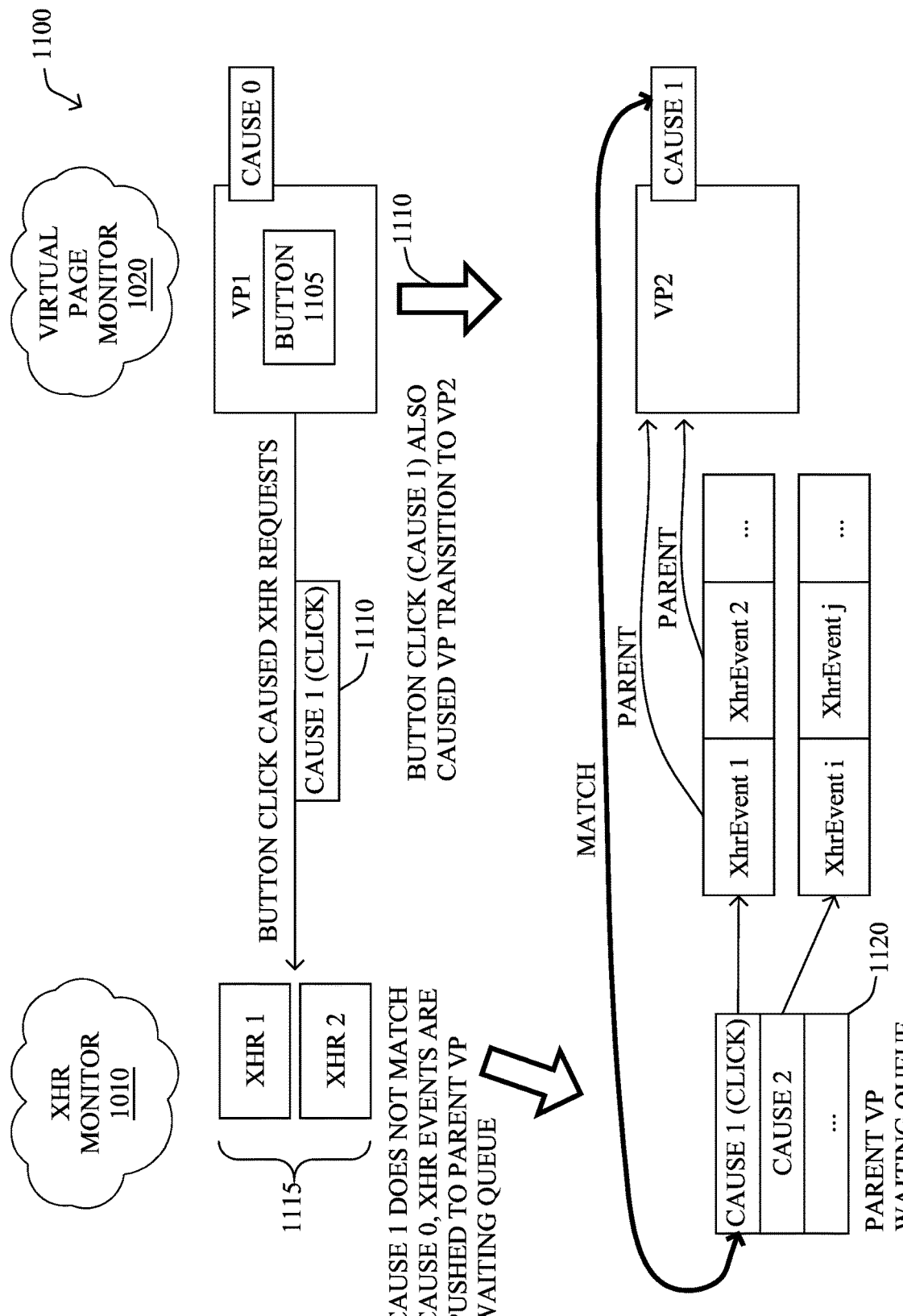
FIG. 11 illustrates an example of a waiting queue for proper correlation.

A demonstration of this is shown in the example 1100 of FIG. 11. A user clicking a button 1105 on virtual page 1 (VP1, e.g., caused by "cause 0") results in a "click" event 1110 ("cause 1") in VP1. This click is stored in a stack, as described above, and may now cause XHR 1 and XHR 2 (XHR events 1115) to be sent out, as well as the transition to virtual page 2 (VP2). As mentioned above, the cause of XHR 1 and XHR 2 (cause 1), would not be the same as virtual page VP1 (cause 0). As such, before the transition to virtual page VP2 is finished, XHR 1 and XHR 2 can be matched neither to virtual page VP1 nor to virtual page VP2. Instead, they are pushed into the parent virtual page waiting queue 1120 (along with cause 1, the click). Once the transition to virtual page VP2 is finished, the VirtualPageMonitor can determine its root cause, which is the "click" (cause 1) in this case, which can then be used as a lookup into the parent virtual page waiting queue 1120 to find the matching root cause (the click) and the associated (i.e., resultant) XHR events 1 and 2. Accordingly, the techniques herein may then correlate these XHR events properly to virtual page VP2.

After a certain period of waiting time (e.g., 2 s), if no new virtual page is created, all XHR events in the waiting queues are correlated to the current virtual page (e.g., VP1 above), and reported, such that the waiting queue can be is cleared. As an example of this, assume that a button click on the virtual page VP1 does not cause any new virtual page transition to VP2, but instead only causes some XHR requests. Since the current virtual page VP1 was not caused by this click (i.e., not by potential "cause 1", but instead by "cause 0"), it is not listed as the root cause. However, according to the techniques herein, the resultant XHRs are correlated to the current virtual page VP1 as they are removed from the waiting queue. (That is, the XHR events were waiting to see if any other virtual pages were generated that may correspond to their root cause—however since no such relationship exists after some given time, the XHRs may simply be correlated to the current virtual page.)

Figure 12:
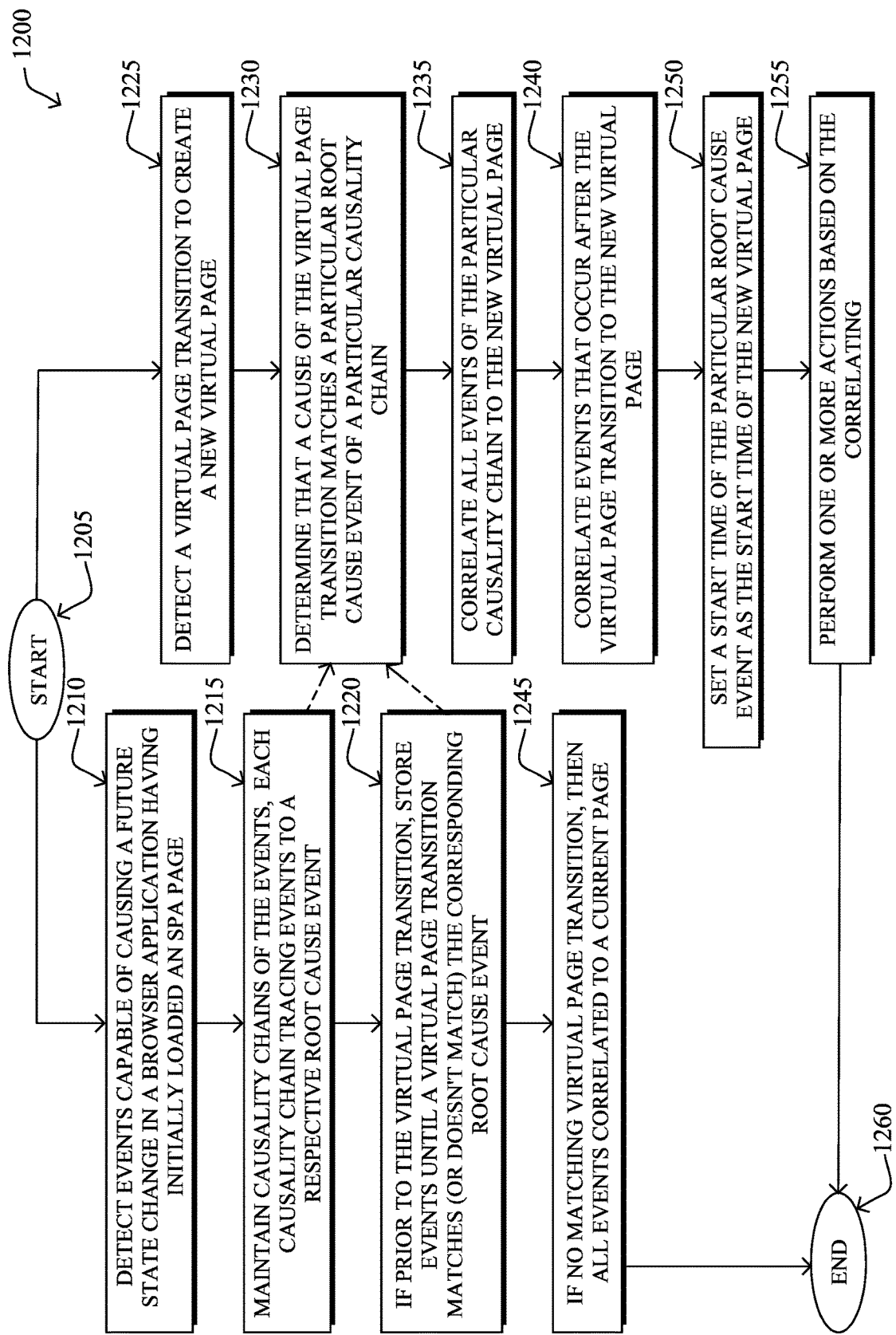
FIG. 12 illustrates an example procedure for cause-based event (e.g., XHR) correlation to virtual page transitions in single page applications (SPAs) in accordance with one or more embodiments described herein.

FIG. 12 illustrates an example simplified procedure for cause-based event (e.g., XHR) correlation to virtual page transitions in single page applications (SPAs) in accordance with one or more embodiments described herein. For example, a non-generic, specifically configured device (e.g., device 200) may perform procedure 1200 by executing stored instructions (e.g., Single Page App Monitoring process 248). The procedure 1200 may start at step 1205, and continues to step 1210, where, as described in greater detail above, a monitoring process detects one or more events capable of causing a future state change in a browser application having initially loaded an SPA page (e.g., explicit user activity, schedule event firing, window messages, XHRs, etc.). In step 1215, the monitoring process maintains one or more causality chains of the one or more events, where, as described above, each causality chain traces events of that causality chain to a respective root cause event of that causality chain. Note that when certain events of a causality chain (or standalone events) occur prior to any associated virtual page transition, then in step 1220 those specific events may be stored (e.g., in a virtual page waiting queue) until a virtual page transition matches the same root cause event of that causality chain.

At the same time, the techniques herein are looking to detect, in step 1225, a virtual page transition to create a new virtual page. Once a virtual page is created, then in step 1230 the monitoring process determines (e.g., through a lookup/comparison) that a cause of the virtual page transition matches a particular root cause event of a particular causality chain from above. Once this match is determined, then in step 1235, the monitoring process may correlate all events of that particular causality chain to the new virtual page. Any events that occur after the virtual page transition may also be correlated to that new virtual page in step 1240. On the other hand, if no virtual page transition occurs that creates a new virtual page based on a matching root cause event of a given causality chain (e.g., within a given threshold of time since a final event of that given causality chain occurs), then in response, all events of the given causality chain can be correlated to a current page in step 1245.

According to one or more embodiments herein, in step 1250 the monitoring process may also set a start time of the particular root cause event as the start time of the new virtual page, as described above.

Furthermore, in step 1255, in certain embodiments, one or more actions may be performed based on the correlating, such as, e.g., measuring one or more metrics based on the correlating, detecting and mitigating an anomaly based on the correlating, and so on.

The illustrative and simplified procedure 1200 may then end in step 1260.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide cause-based event correlation to virtual page transitions in SPAs, particularly XHR correlation. As mentioned above, correlating XHRs simply by when they occur in time and which virtual page is functional at that time will inaccurately correlate a large percentage of XHRs, which occur right before the next virtual page transition occurs to directly provide content for that new virtual page. The techniques herein thus address this problem and provide an accurate picture of which XHRs relate to which virtual page. Illustratively, in a single page application, when a user navigates from one URL to another (i.e., a transition), this transition time is an important metric in web monitoring. Slow transition times may be an indicator that the websites are not working properly. If the URL change time is used as the transition start time, it is not correct, since the resources and other functions related to the new virtual page may be running before the URL change. Furthermore, different libraries and frameworks would cause the measurements to be incorrect, as well.

In still further embodiments of the techniques herein, a business impact of virtual page transitions in SPAs can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the XHRs to their network metrics and with various business transactions in order to better understand the affect the XHRs and virtual page transitions may have had on the business transactions, accordingly.

—Determining End Times for SPAs—

As noted above, Single Page Apps (SPAs) have changed the loading behavior of web pages, and traditional performance metric monitoring techniques are inadequate. Historically, for example, websites would request resources from server and a web page was said to be loaded by the browser when all the resources had been fetched. With SPAs, however, the web page is not actually loaded completely when browsers traditionally mark it as loaded, because of the different loading behavior of SPAs. For instance, browser events like "onload," "DOMContentLoaded," etc. do not give accurate metrics for Single Page Apps. Also, when a user navigates to a new page, the content may be fetched without loading a new page. As such, the browser may be unaware of such pages, and there is currently no mechanism in place to determine when such pages have actually loaded.

Certain additional techniques herein, therefore, provide information that may be used for accurately calculating end times of different page loads in Single Page Application (SPA) frameworks.

In particular, Java Script Agents ("JSAgents"), as mentioned above, may be configured to collect and reports performance data about web pages and their resources, such as JS, CSS, images, etc. Load Time ("onLoad"), in particular, is a metric obtained when a browser fires an event onLoad when a web page is completely loaded. The onLoad time is traditionally described as the time at which all of the objects in the document are in the Document Object Model (DOM) (a programming interface for HTML and XML documents that represents the page so that programs can change the document structure, style, and content), and all the images, scripts, links, and sub-frames have also finished loading.

Figure 13:
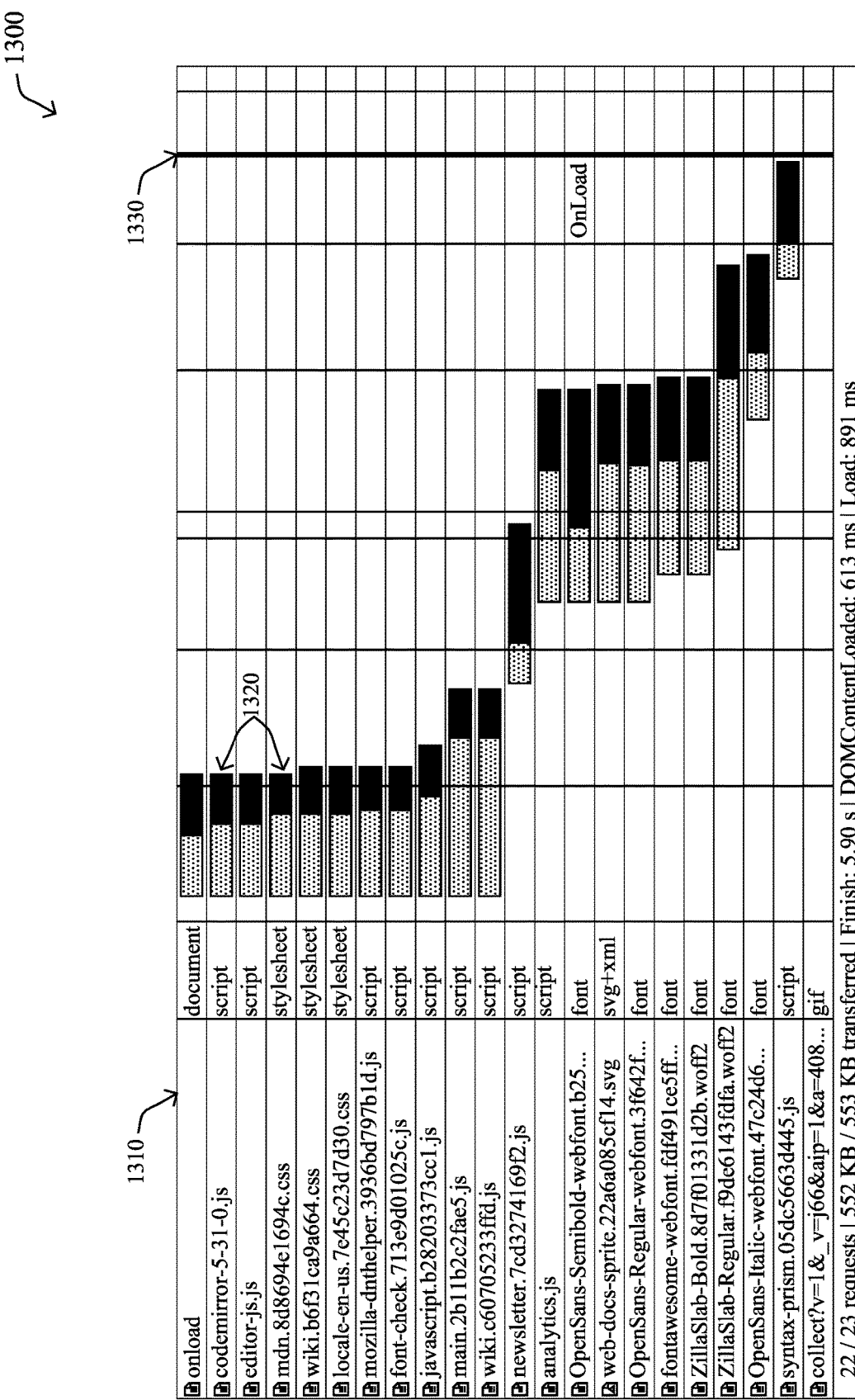
FIG. 13 illustrates an example of load time computation based on loaded resources.

FIG. 13 represents a time-chart 1300 of network requests 1310 and their associated timing 1320 depicting an onLoad time 1330 of a website (a non-SPA website). As can be seen, at onLoad, all of the resources have been loaded successfully.

Figure 14:
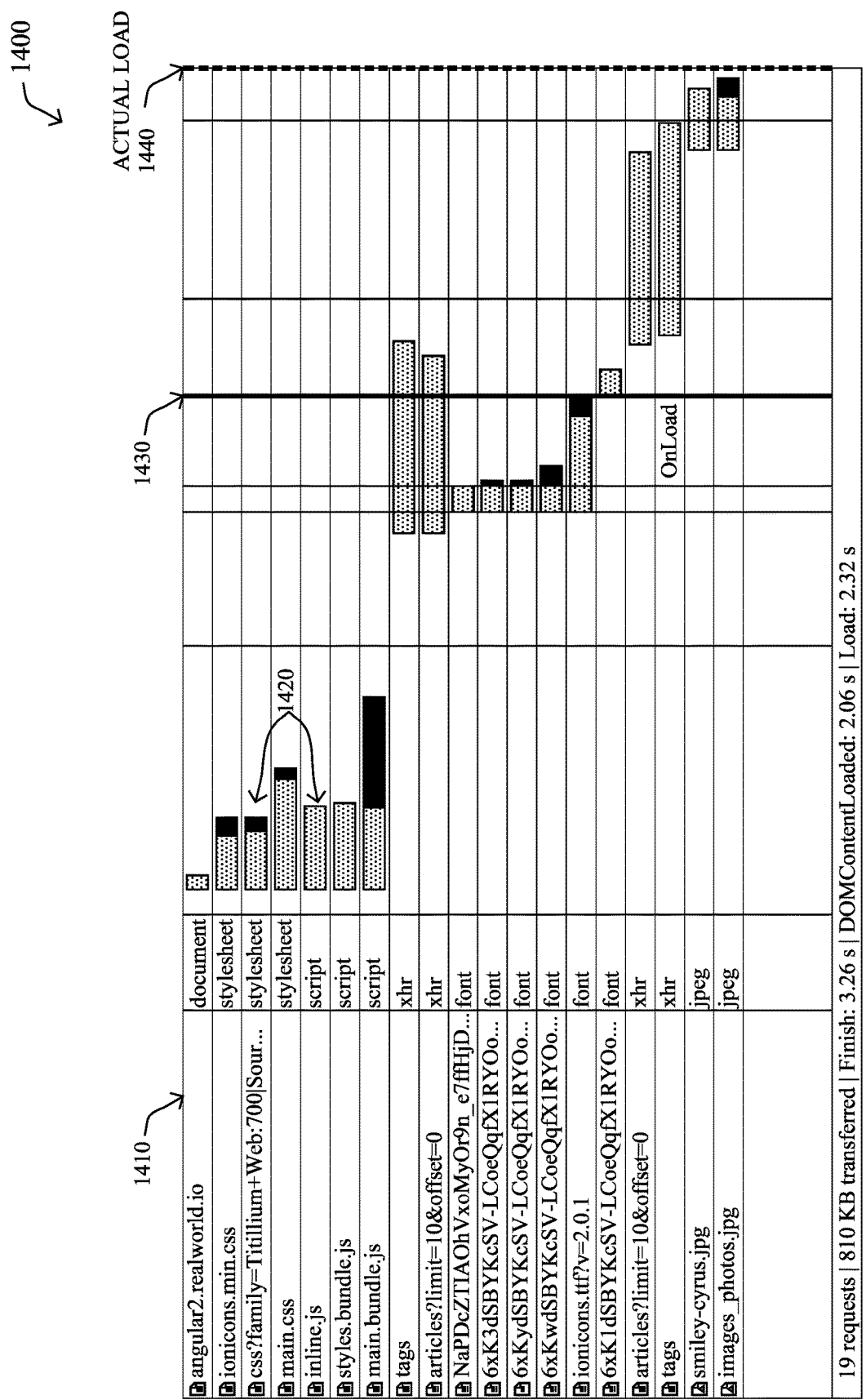
FIG. 14 illustrates another example of load time computation based on loaded resources.

FIG. 14, on the other hand, illustrates an example time-chart 1400 for network requests 1410 of a Single Page App (SPA). Here, the associated timing 1420 shows a different story, where the depicted onLoad time 1430 is in the middle of the resources being loaded. That is, as can be readily seen, the "actual load time" 1440 of website is much more than onLoad time reported by browser.

In particular, as many resources can be fetched through XMLHttpRequests (XHRs) or other events, the resources have not yet finished loading at the onLoad time 1430 here, and the actual load time 1440 for this website should be the time at which the last resource (e.g., "images_photos.jpg") has been loaded and rendered. To explain why this is happening, Single Page Apps, because of their design, load resource dynamically, and the browser is unaware of dynamic resources (e.g., XHRs) being loaded. Hence, the browser does not accurately report "actual load time" for SPAs, since SPAs also use XHRs to load many resources on a website, as historically XHRs are never included in determining the onLoad time (as they are unknown to the browser).

The techniques herein, on the other hand, do determine a more accurate measurement of Single Page App end times, and thus load times (e.g., using the start times calculated above). As described below, by tracking the resource/XHR loads using load listeners and waiting for all the resources/XHRs to finish loading (i.e., waiting for all the load events to finish), the techniques herein can deem a page (a full page or a virtual page) completed by marking that finish time as the end time of the page.

Specifically, according to one or more additional or alternative embodiments of the disclosure as described in detail below, a monitoring process detects a page load start time of a single page application (SPA) page having added direct resources and dynamic resources, tracks the direct resources and dynamic resources, and notes a load end time for each of the tracked direct resources and dynamic resources. The monitoring process stops the tracking of the direct resources and dynamic resources in response to a determination of a threshold duration of network inactivity, and determines a maximum load end time of the tracked direct resources and dynamic resources. Accordingly, the monitoring process may then set a page load time of the SPA page as a difference between the maximum load end time and the page load start time.

Operationally, for determining single page app end times and load times, it should be noted that a resource in a page can either be added directly or dynamically. Since the browser is unaware of the dynamic resources (e.g., XHRs) being added on the page as mentioned above, in order to determine the "actual load time" of SPA, the techniques herein track all of the resources (direct and dynamic/XHRs) loaded on the page and wait for network inactivity. Once the network is inactive for a threshold amount of time, the time at which network started being inactive can be set/declared to be the "actual load time".

According to one or more embodiments of the techniques herein, the illustrative Single Page App Monitoring process 248 may track all of the resources loaded and rendered on the page, and wait for a detected period of network inactivity. Generally, there are three types of direct resources to consider:

i) Images—Tracking load and render time;
ii) Scripts—Tracking load time; and
iii) Stylesheets—Tracking load time.

Other resources may also be considered, such as fonts or future types of resources, and those listed here are primary examples only. Note further that images, in particular, may also be rendered on a page after loading, and as such, the techniques herein may specifically consider both load and render time of images.

To perform an algorithm in accordance with the present disclosure, the techniques herein may add "hooks" (e.g., event loggers using a JSAgent in DOM) to track any image, script, css (stylesheet), etc. added as a direct resource anytime on a page. The hooks then attach a load listener to each of these resources, such that when a load listener gets invoked, the techniques herein note the load timestamp of that resource (i.e., the time at which the resource completed loading or rendering). Accordingly, the resource having the latest/max load timestamp is the last resource to be loaded/rendered on the page.

Figure 15:
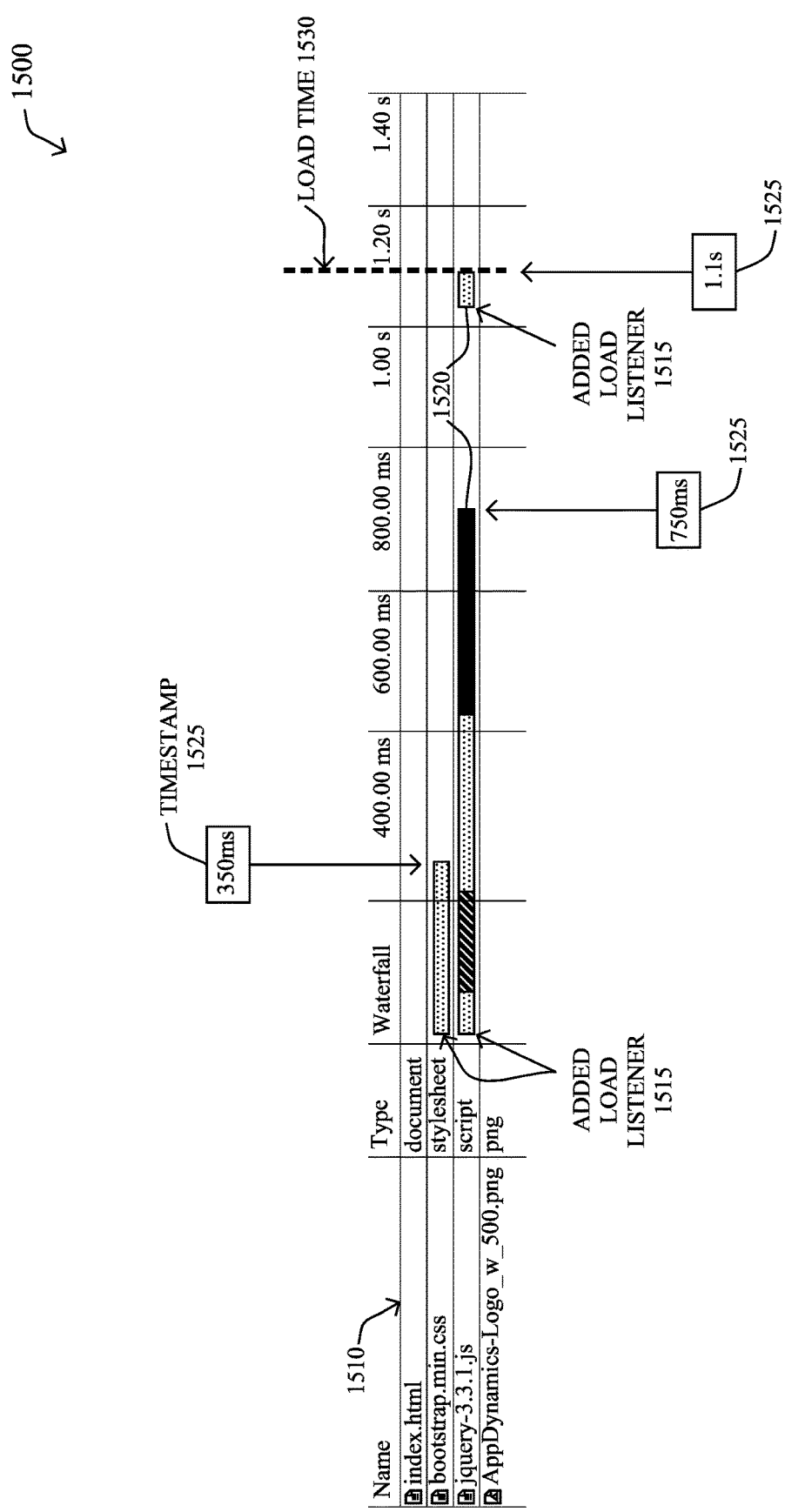
FIG. 15 illustrates an example of load listener load times for resources.

The illustrative algorithm can be better explained with reference to FIG. 15, showing a time-chart 1500 of direct resources 1510 loading on a page. In particular, hooks (e.g., added by JSAgent in DOM) track scripts, stylesheets, and images being added to the page (resources 1510), which add a load listener 1515 upon the resource being added to page. When the load listener is invoked for any resource after some associated timing 1520 of the loading/rendering of the resource, the techniques herein note the timestamp 1525 of that resource. As mentioned above, the maximum timestamp (latest time) among all of the timestamps is the direct resource load time 1530 of the page.

As shown in the example 1500, therefore, load listeners have been added to resources when they are added in DOM:

bootstrap.min.css loaded at 350 ms;
jquery-3.3.1.js loaded at 780 ms; and
AppDynamics-Logo_w_500.png loaded at 1.1 s.

Since 1.1 s is the max timestamp among all the direct resources, the direct resource load time 1530 ("1530-DR") for this page is illustratively set/declared to be 1.1 seconds according to the techniques herein.

Notably, however, since XHRs are also being used by SPAs to load resources and data for the website, an algorithm is also considered herein to track XHRs (or other dynamic resources), similarly to the direct resource tracking above. (Note that in certain embodiments, the direct and dynamic resources may be tracked by the same algorithm.) In particular, hooks may also be added (e.g., by the JSAgent) to track firing and loading of XHRs. That is, when any XHR is loaded, note the timestamp 1525, and the max timestamp among all the timestamps is the XHR load time ("1530-XHR"). (Note further that there may be no need to add a load listener for XHRs, because XHRs loading can directly be tracked by adding hooks to the XHR "load" function, as may be appreciated by those skilled in the art.)

According to the techniques herein, the SPA's Load Time can be computed as the maximum of the load times of the direct and dynamic resources, that is:

SPA Load Time=max(Resource Load Time,XHR Load Time)   Eq. 1.

One important consideration, however, is how to determine when to stop tracking the resources to determine the "last" loaded resource. According to one or more embodiments of the techniques herein, a determination of network inactivity may be used as an appropriate assumption of page completion (or alternatively, page failure). That is, when there is a network inactiveness of some set (or dynamically determined) threshold of time (e.g., 5 seconds), the techniques herein may stop tracking and compute the SPA Load Time under the generally valid assumption that the page is loaded (or has failed or stalled).

Figure 16:
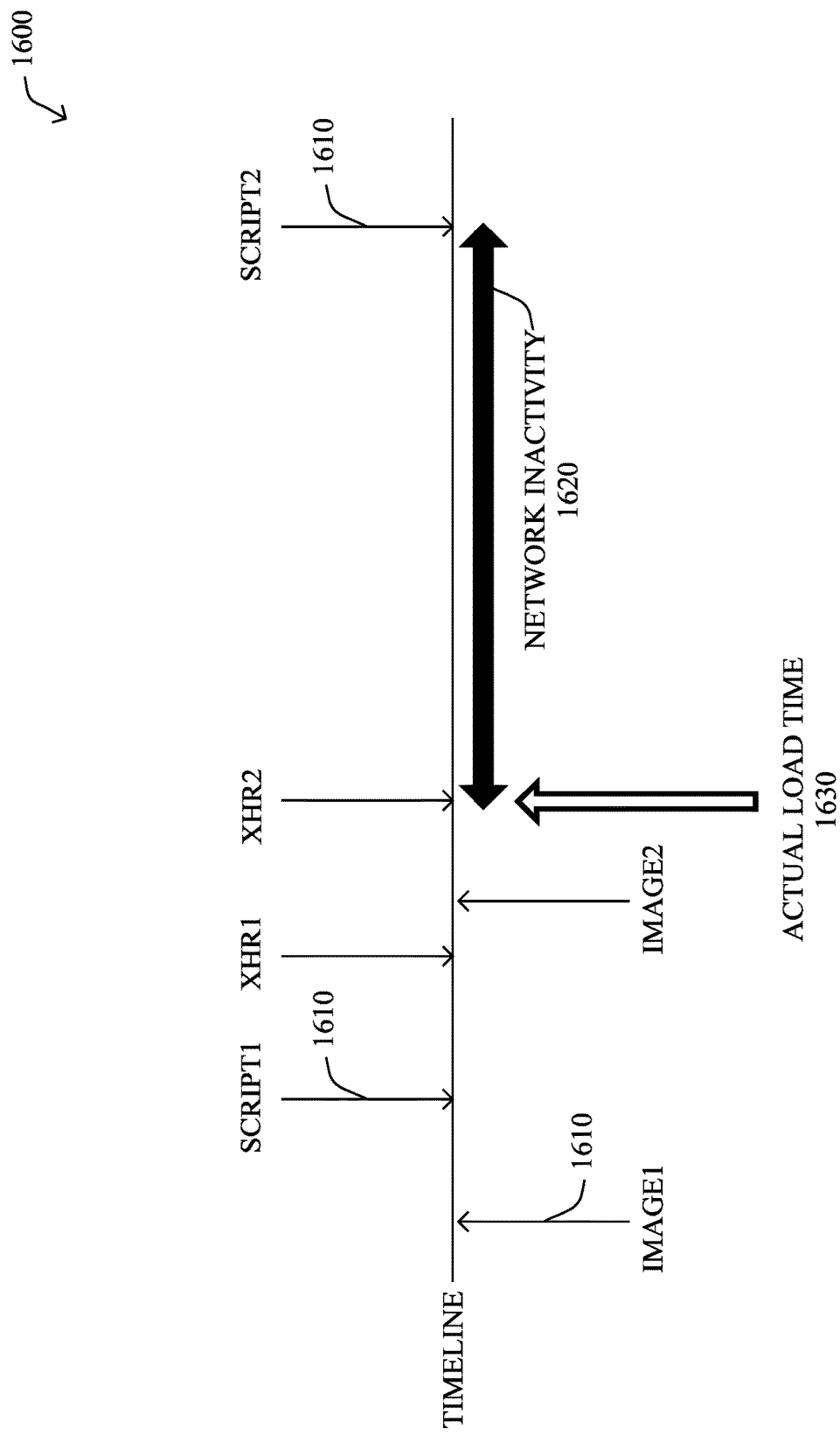
FIG. 16 illustrates an example of a determination of load/end times of an SPA page.

FIG. 16 illustrates an example timeline 1600 showing a collection of resource load times 1610 (e.g., Image1, Script1, XHR1, Image2, XHR2, and then eventually, Script2). Since there is a large gap in the timeline (that is, there is a period of time 1620 with no load times or any other monitored activity occurring, where that period of time is longer than the threshold length of time, e.g., for 5 seconds), notably between XHR2 and Script2, the techniques herein classify that time span 1620 as network inactive time. Accordingly, the techniques herein dictate that the actual load time 1630 is the time when XHR2 (the max load timestamp time) has loaded on the page prior to reaching that network inactive time 1620.

Notably, the technique herein have generally used the term "load time". Those skilled in the art will appreciate that a load time may indicate either the time of day, or the time since a timer that is initiated (0.0 s) at the start time. In either event, either the start time may be subtracted from the end to determine the load time (i.e., calculating the length of time required to load the page), or else the load time directly implies the length of time required to load the page.

In accordance with the techniques herein, if the load time of a page is higher than normal (e.g., set baseline or a determined average), then that particular page load may be determined to be slower than normal, which can be due to any of the following reasons, among others:

1. Loading heavy resources on page;
2. XHRs are taking more time than usual; and
3. Resources are unreachable or otherwise stalled.

For example, when measuring load time of a page in SPA in the manner above, an accurate measurement of how SPAs are performing. For example, in a page, if there are a lot of heavy resources, lots of XHRs, or otherwise, the page will load slowly and hence effect the load time of that page. As such, measuring load time of a page is the basic and necessary metric to measure performance of SPAs, to determine how quickly/slowly the SPA web application is. Additionally, by calculating the "endTime" of a page in SPA web application in this manner (i.e., the time at which page loaded successfully with all resources and XHRs), then if the loadTime (endTime–startTime) is higher than usual, it may also mean that the page is designed poorly and should be optimized. It could also be an indication that the page is using heavy resources and XHRs, which could be hindering the user experience.

Notably, the techniques herein can be used for initial page loads and subsequent new pages (i.e., virtual pages) in SPAs. That is, the same algorithm described above runs for the initial page load and then again for any subsequent virtual pages that are loaded. In the event that that a user navigates away from the page in between the start time and the expected load/end time, the page load time computation algorithm above may be stopped before it is able to complete (i.e., when the user navigates away from the page), and that stop time (e.g., stopped at X seconds) becomes the page load time (X seconds) for metric tracking of length of time since the start of the page load to the navigation.

Figure 17:
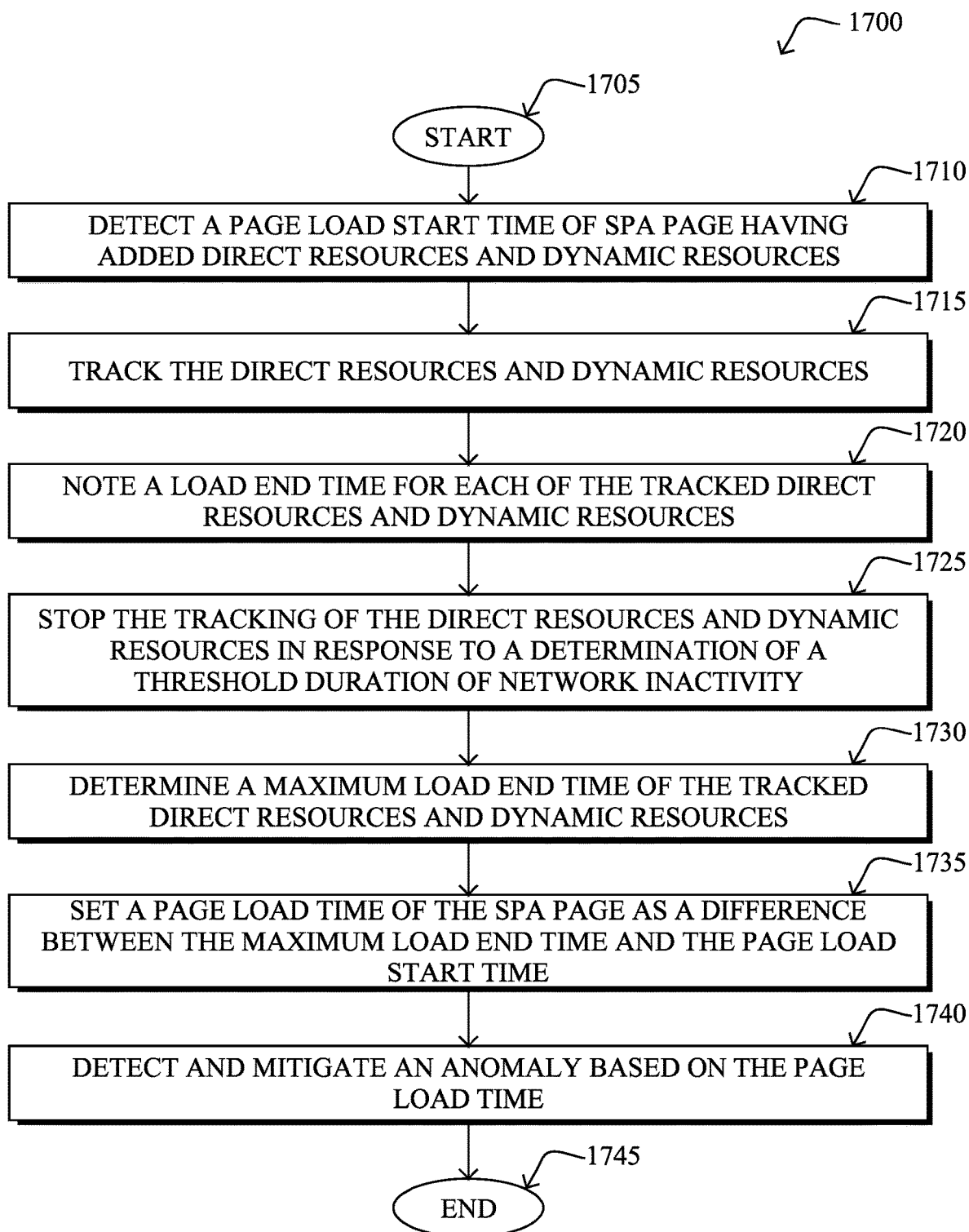
FIG. 17 illustrates an example procedure for determining load/end times for SPAs in accordance with one or more embodiments described herein.

FIG. 17 illustrates an example simplified procedure for determining load/end times for SPAs in a network in accordance with one or more embodiments described herein. For example, a non-generic, specifically configured device (e.g., device 200) may perform procedure 1700 by executing stored instructions (e.g., Single Page App Monitoring process 248). The procedure 1700 may start at step 1705, and continues to step 1710, where, as described in greater detail above, a monitoring process detects a page load start time of an SPA page (e.g., an initial page load or a subsequent virtual page load) having added direct resources and dynamic resources. As mentioned above, the dynamic resources may comprise XHRs, while the direct resources may comprise images, scripts, stylesheets, fonts, etc.

In step 1715, the monitoring process tracks the direct resources and dynamic resources, and notes a load end time for each of the tracked direct resources and dynamic resources in step 1720. In particular, as detailed above, in certain embodiments tracking direct resources comprises adding a hook to each added direct resource of the SPA page, adding a load listener to each of the added direct resources, and determining the load end time of each load listener when invoked, wherein the load end time for each of the direct resources is the load end time of a corresponding load listener. Conversely, tracking dynamic resources may comprise adding a hook to each added dynamic resource of the SPA page, tracking firing and loading of the added dynamic resources, and determining the load end time of each dynamic resource when loaded. (Note that in either case, adding the hook may comprise a JSAgent in a DOM.)

Resources are tracked until step 1725, where the monitoring process stops the tracking in response to a determination of a threshold duration of network inactivity (e.g., determining network inactivity in response to expiration of the threshold duration since any resources have loaded on the SPA page.) At this time, in step 1730, the monitoring process may determine a maximum load end time of the tracked direct resources and dynamic resources, and can then set a page load time of the SPA page as a difference between the maximum load end time and the page load start time in step 1735. Note that while in one embodiment the start and end times may be actual times (e.g., 12:34.56 AM), thus requiring an actual subtraction to determine the load time, in other embodiments, the page load start time is the initiating time (e.g., is a time set to zero), and load times indicate a length of time since the page load start time.

Various actions may be performed based on this measured time, such as detecting and mitigating an anomaly based on the page load time in step 1740 as shown, among other possibilities. The simplified procedure 1700 may illustratively end in step 1745, until a new page is loaded.

It should be noted that while certain steps within procedure 1700 may be optional as described above, the steps shown in FIG. 17 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200 and 1700 are described separately, certain steps from each procedure may be incorporated into each other procedure, and the procedures are not meant to be mutually exclusive.

The techniques described herein, therefore, also determine end times and load for SPAs, particularly by tracking both direct and dynamic resources (e.g., XHRs) to calculate the "actual load time" with a high degree of accuracy on all types of web browsers. Notably, marking network inactivity as a time span where nothing is happening (no resources or XHRs are in progress) is performant. Previous solutions have used different ways to determine network inactivity, but they are less performant and less accurate, and specifically do not account for XHRs fired on the page.

In still further embodiments of the techniques herein, a business impact of end times for SPAs can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the end times for SPAs to their network metrics and with various business transactions in order to better understand the affect the end times for SPAs may have had on the business transactions, accordingly.

Illustratively, the techniques described herein may be performed by hardware, software, and/or firmware, such as in accordance with the illustrative Single Page App Monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   detecting, by a monitoring process, a page load start time of a single page application (SPA) page having added direct resources and dynamic resources, wherein the direct resources comprise images, scripts, stylesheets, or fonts, further wherein the dynamic resources comprise Extensible Markup Language Hypertext Transfer Protocol Requests (XHRs);
   tracking, by the monitoring process and using load listeners that are added the each of the direct resources, the direct resources and dynamic resources;
   noting, by the monitoring process, a load end time for each of the tracked direct resources and dynamic resources;
   determining, by the monitoring process and using load end times from the load listeners, network inactivity in response to expiration of a threshold duration since any resources, including the direct resources and the dynamic resources, have loaded on the SPA page;
   stopping, by the monitoring process and in response to determining the network inactivity, the tracking of the direct resources and dynamic resources;
   determining, by the monitoring process, a maximum load end time of the tracked direct resources and dynamic resources; and
   setting, by the monitoring process, a page load time of the SPA page as a difference between the maximum load end time and the page load start time.

2. The method as in claim 1, wherein tracking direct resources comprises:
   adding a hook to each added direct resource of the SPA page;
   adding the load listeners; and
   determining the load end times when the load listeners are invoked, wherein the load end time for each of the direct resources is the load end time of a corresponding load listener.

3. The method as in claim 2, wherein adding the hook comprises a javascript agent (JSAgent) in a Document Object Model (DOM).

4. The method as in claim 1, wherein tracking dynamic resources comprises:
   adding a hook to each added dynamic resource of the SPA page;
   tracking firing and loading of the added dynamic resources; and
   determining the load end time of each dynamic resource when loaded.

5. The method as in claim 4, wherein adding the hook comprises a javascript agent (JSAgent) in a Document Object Model (DOM).

6. The method as in claim 1, wherein the page load start time is set to zero, and wherein load times indicate a length of time since the page load start time.

7. The method as in claim 1, wherein the SPA page is one of either an initial page load or a subsequent virtual page load.

8. The method as in claim 1, further comprising:
   detecting an anomaly based on the page load time; and
   mitigating the anomaly.

9. A tangible, non-transitory, computer-readable medium storing program instructions that cause a computer to execute a process comprising:
   detecting a page load start time of a single page application (SPA) page having added direct resources and dynamic resources, wherein the direct resources comprise images, scripts, stylesheets, or fonts, further wherein the dynamic resources comprise Extensible Markup Language Hypertext Transfer Protocol Requests (XHRs);
   tracking, using load listeners that are added the each of the direct resources, the direct resources and dynamic resources;
   noting a load end time for each of the tracked direct resources and dynamic resources;
   determining, using load end times from the load listeners, network inactivity in response to expiration of a threshold duration since any resources, including the direct resources and the dynamic resources, have loaded on the SPA page;
   stopping, in response to determining the network inactivity, the tracking of the direct resources and dynamic resources;
   determining a maximum load end time of the tracked direct resources and dynamic resources; and
   setting a page load time of the SPA page as a difference between the maximum load end time and the page load start time.

10. The computer-readable medium as in claim 9, wherein the process, for tracking direct resources, further comprises:
    adding a hook to each added direct resource of the SPA page;
    adding the load listeners; and
    determining the load end times listener when the load listeners invoked, wherein the load end time for each of the direct resources is the load end time of a corresponding load listener.

11. The computer-readable medium as in claim 9, wherein the process, for tracking dynamic resources, further comprises:
    adding a hook to each added dynamic resource of the SPA page;
    tracking firing and loading of the added dynamic resources; and
    determining the load end time of each dynamic resource when loaded.

12. The computer-readable medium as in claim 9, wherein the SPA page is one of either an initial page load or a subsequent virtual page load.

13. The computer-readable medium as in claim 9, wherein the process further comprises:
    detecting an anomaly based on the page load time; and
    mitigating the anomaly.

14. An apparatus, comprising:
    one or more network interfaces to communicate with a network;
    a processor coupled to the network interfaces and configured to execute one or more processes; and a memory configured to store a process executable by the processor, the process when executed configured to:

detect a page load start time of a single page application (SPA) page having added direct resources and dynamic resources, wherein the direct resources comprise images, scripts, stylesheets, or fonts, further wherein the dynamic resources comprise Extensible Markup Language Hypertext Transfer Protocol Requests (XHRs);

track, using load listeners that are added the each of the direct resources, the direct resources and dynamic resources;

note a load end time for each of the tracked direct resources and dynamic resources;

determine, using load end times from the load listeners, network inactivity in response to expiration of a threshold duration since any resources, including the direct resources and the dynamic resources, have loaded on the SPA page;

stop, in response to a determination of the network inactivity, the tracking of the direct resources and dynamic resources;

determine a maximum load end time of the tracked direct resources and dynamic resources; and set a page load time of the SPA page as a difference between the maximum load end time and the page load start time.

\* \* \* \* \*

UNITED STATES PATENT AND TRADEMARK OFFICE
CERTIFICATE OF CORRECTION

PATENT NO. : 10,911,517 B2
APPLICATION NO. : 16/278136
DATED : February 2, 2021
INVENTOR(S) : Shubham Jindal et al.

Page 1 of 1

It is certified that error appears in the above-identified patent and that said Letters Patent is hereby corrected as shown below:

In the Specification

Column 17, Line 27, please amend as shown:
state of web applications to transition:

In the Claims

Column 28, Line 43, please amend as shown:
determining the load end times when the load Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*